United States Patent
Marinier et al.

(10) Patent No.: US 12,237,903 B2
(45) Date of Patent: *Feb. 25, 2025

(54) SYSTEMS AND METHODS FOR BEAMFORMED UPLINK TRANSMISSION

(71) Applicant: INTERDIGITAL PATENT HOLDINGS, INC., Wilmington, DE (US)

(72) Inventors: Paul Marinier, Brossard (CA); Tao Deng, Roslyn, NY (US); Benoit Pelletier, Roxboro (CA); J. Patrick Tooher, Montreal (CA); Ghyslain Pelletier, Montreal (CA); Virgil Comsa, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/761,051

(22) Filed: Jul. 1, 2024

(65) Prior Publication Data

US 2024/0356619 A1    Oct. 24, 2024

Related U.S. Application Data

(63) Continuation of application No. 18/112,690, filed on Feb. 22, 2023, which is a continuation of application
(Continued)

(51) Int. Cl.
*H04B 7/06* (2006.01)
*H04B 7/0404* (2017.01)
(Continued)

(52) U.S. Cl.
CPC ......... *H04B 7/0695* (2013.01); *H04B 7/0404* (2013.01); *H04B 7/0456* (2013.01);
(Continued)

(58) Field of Classification Search
None
See application file for complete search history.

(56) References Cited

U.S. PATENT DOCUMENTS

2002/0036718 A1    3/2002  Lee
2011/0310883 A1    12/2011 Takano
(Continued)

FOREIGN PATENT DOCUMENTS

CN    103039019 A    4/2013
CN    103688474      3/2014
(Continued)

OTHER PUBLICATIONS

Third Generation Partnership Project, "Technical Specification Group Radio Access Network; E-UTRA and UTRA Radio Frequency (RF) Requirement Background for Active Antenna System (AAS) Base Station (BS)". 3GPP TR 37.842, V1.8.0, Release 13, Oct. 2015, pp. 1-46 (46 pages).
(Continued)

*Primary Examiner* — Walter J Divito
(74) *Attorney, Agent, or Firm* — Klintworth & Rozenblat IP LLP

(57) ABSTRACT

Systems and methods described herein are provided for beamforming and uplink control and data transmission techniques. Such techniques enable a UE to maintain at least one beam process for operation with multiple beams and/or points. A beam process may be indicated for transmission or reception over a downlink or uplink physical channel. Power, timing, and channel state information may be specific to a beam process. A beam process may be established as part of a random access procedure in which resources may be provisioned in random access response messages. Techniques are provided to handle beam process failures, to use
(Continued)

beam processes for mobility, and to select beams using open-loop and closed-loop selection procedures.

20 Claims, 12 Drawing Sheets

Related U.S. Application Data

No. 17/558,428, filed on Dec. 21, 2021, now Pat. No. 11,626,919, which is a continuation of application No. 16/097,781, filed as application No. PCT/US2017/030920 on May 3, 2017, now Pat. No. 11,245,456.

(60) Provisional application No. 62/440,903, filed on Dec. 30, 2016, provisional application No. 62/373,076, filed on Aug. 10, 2016, provisional application No. 62/334,754, filed on May 11, 2016.

(51) Int. Cl.
| | |
|---|---|
| *H04B 7/0456* | (2017.01) |
| *H04L 5/00* | (2006.01) |
| *H04W 52/52* | (2009.01) |
| *H04W 56/00* | (2009.01) |
| *H04W 72/23* | (2023.01) |
| *H04W 74/0833* | (2024.01) |

(52) U.S. Cl.
CPC ......... *H04B 7/0617* (2013.01); *H04L 5/0051* (2013.01); *H04W 52/52* (2013.01); *H04W 56/0045* (2013.01); *H04W 72/23* (2023.01); *H04W 74/0833* (2013.01)

(56) References Cited

U.S. PATENT DOCUMENTS

| | | |
|---|---|---|
| 2012/0314654 A1 | 12/2012 | Kotecha |
| 2013/0065622 A1 | 3/2013 | Hwang |
| 2013/0102345 A1 | 4/2013 | Jung |
| 2013/0142271 A1 | 6/2013 | Nilsson |
| 2013/0301619 A1 | 11/2013 | Singh |
| 2014/0323143 A1 | 10/2014 | Jung |
| 2015/0029966 A1 | 1/2015 | Park |
| 2015/0249973 A1 | 9/2015 | Park |
| 2015/0333885 A1 | 11/2015 | Athley |
| 2015/0341132 A1 | 11/2015 | Hwang |
| 2016/0006122 A1 | 1/2016 | Seol |
| 2016/0099763 A1 | 4/2016 | Chen |
| 2016/0211899 A1 | 7/2016 | Yang |
| 2016/0241323 A1 | 8/2016 | Ko |
| 2017/0195033 A1 | 7/2017 | Zhang et al. |
| 2017/0195998 A1 | 7/2017 | Zhang |
| 2017/0202029 A1 | 7/2017 | Qi |
| 2017/0302355 A1 | 10/2017 | Islam |
| 2017/0318541 A1 | 11/2017 | Islam |
| 2018/0020433 A1* | 1/2018 | Lee ............... H04J 11/0026 |

FOREIGN PATENT DOCUMENTS

| | | |
|---|---|---|
| CN | 104702324 A | 6/2015 |
| JP | 2002185391 | 6/2002 |
| JP | 2010206421 | 9/2010 |
| JP | 2015513237 | 4/2015 |
| JP | 2015530018 | 10/2015 |
| JP | 2017532881 | 11/2017 |
| KR | 20060071321 A | 6/2006 |
| KR | 20140129625 A | 11/2014 |
| WO | 2013157789 A1 | 10/2013 |
| WO | 2015016489 | 2/2015 |
| WO | 2016044991 | 3/2016 |
| WO | 2016044994 | 3/2016 |

OTHER PUBLICATIONS

International Search Report and Written Opinion of the International Searching Authority for PCT/US2017/030920 mailed Oct. 6, 2017 (17 pages).
Third Generation Partnership Project, "Technical Specification Group Radio Access Network; Study on Scenarios and Requirements for Next Generation Access Technologies". 3GPP TR 38.913, v0.3.0, Release 14, Mar. 2016, pp. 1-30 (30 pages).
Third Generation Partnership Project, "Views on Beamforming with a Large Number of Antennas". InterDigital Communications, 3GPP TSG-RAN WG1 Meeting #85, R1-165062, May 23-27, 2016, pp. 1-5 (5 pages).
Third Generation Partnership Project, "Technical Specification Group Radio Access Network; Evolved Universal Terrestrial Radio Access (E-UTRA); Physical Layer Procedures". 3GPP TS 36.213, V12.9.1, Release 12, Mar. 2016, pp. 1-241 (241 pages).
Alkahteeb, A. et al., "MIMO Precoding and Combining Solutions for Millimeter-Wave Systems". IEEE Communications Magazine, vol. 52, No. 12, Dec. 2014, pp. 122-131 (10 pages).
International Preliminary Report on Patentability for PCT/US2017/030920 completed Jul. 24, 2018 (17 pages).
Written Opinion of the International Preliminary Examining Authority PCT/US2017/030920 mailed Apr. 10, 2018 (9 pages).
Third Generation Partnership Project, "Views on Massive MIMO for New Radio". InterDigital Communications, 3GPP TSG-RAN WG1 #85, R1-165063, May 23-27, 2016, pp. 1-6 (6 pages).
Third Generation Partnership Project, "New Study Item Proposal: Study on Scenarios and Requirements for Next Generation Access Technologies". CMCC, 3GPP TSG RAN Meeting #70, RP-152257, Dec. 7-10, 2015 (5 pages).
Invitation to pay additional fees and, where applicable, protest fees mailed on Aug. 7, 2017 for PCT/US2017/030920 (17 pages).
Rusek, F., et al., "Scaling Up MIMO: Opportunities and Challenges with Very Large Arrays". IEEE Signal Processing Magazine, vol. 30, No. 1, pp. 40-60, Jan. 2013 (21 pages).
Third Generation Partnership Project, "Technical Specification Group Radio Access Network; Study on Scenarios and Requirements for Next Generation Access Technologies". 3GPP TR 38.913, v0.2.1, Release 14, Mar. 2016, pp. 1-27 (27 pages).
Third Generation Partnership Project, "New SID Proposal: Study on New Radio Access Technology". NTT Docomo, 3GPP TSG RAN Meeting #71, RP-160671, Mar. 7-10, 2016 (8 pages).

* cited by examiner

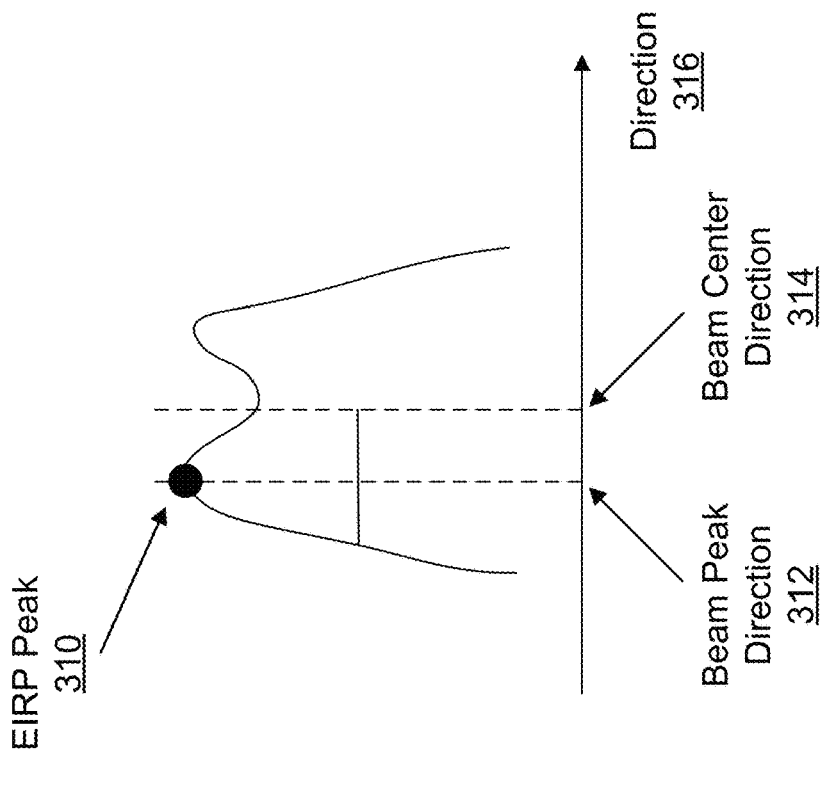
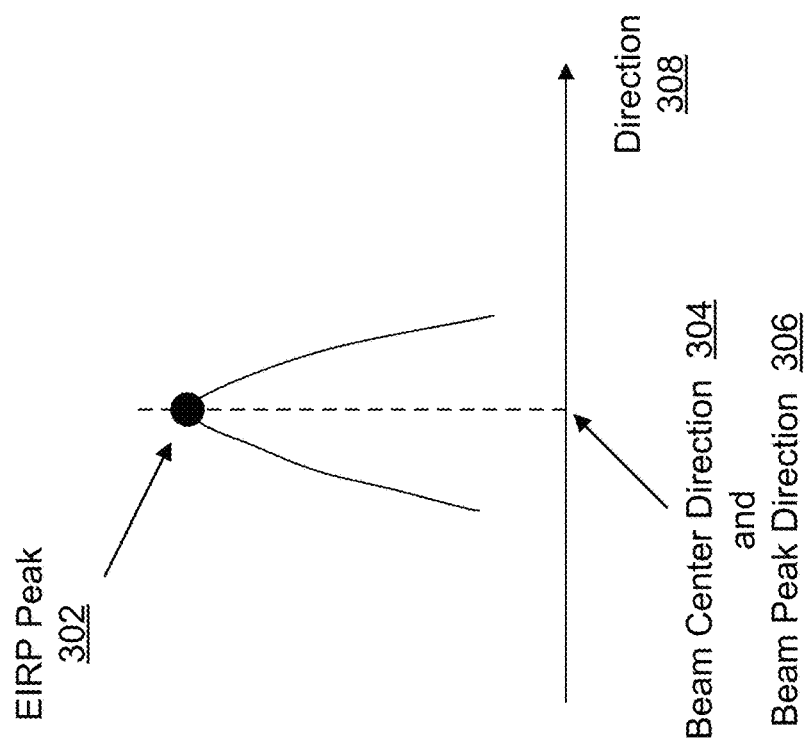
FIG. 3B
FIG. 3A

SYSTEMS AND METHODS FOR BEAMFORMED UPLINK TRANSMISSION

CROSS-REFERENCE TO RELATED APPLICATIONS

The present application is a continuation application of U.S. patent application Ser. No. 18/112,690, entitled "Systems and Methods for Beamformed Uplink Transmission" and filed Feb. 22, 2023, which is a continuation of U.S. patent application Ser. No. 17/558,428, entitled "Systems and Methods for Beamformed Uplink Transmission" and filed Dec. 21, 2021, now U.S. Pat. No. 11,626,919, issued Apr. 11, 2023, which is a continuation application of U.S. patent application Ser. No. 16/097,781, entitled "Systems and Methods for Beamformed Uplink Transmission" and filed Oct. 30, 2018, now U.S. Pat. No. 11,245,456, issued Feb. 8, 2022, which claims the benefit under 35 U.S.C. § 371 of International Application No. PCT/US2017/030920, entitled "Systems and Methods for Beamformed Uplink Transmission" and filed on May 3, 2017, which claims benefit under 35 U.S.C. § 119(e) from U.S. Provisional Patent Application No. 62/440,903, entitled "Systems and Methods for Beamformed Uplink Transmission," filed Dec. 30, 2016, from U.S. Provisional Patent Application No. 62/373,076, entitled "Systems and Methods for Beamformed Uplink Transmission," filed Aug. 10, 2016, and from U.S. Provisional Patent Application No. 62/334,754, entitled "Systems and Methods for Beamformed Uplink Transmission," filed May 11, 2016. All of above applications are incorporated by reference in their entirety.

BACKGROUND

To meet the high data rates required for the next generation of cellular communication systems, the wireless industry and academia have been exploring ways to leverage large bandwidths available at high frequencies, such as cmW and mmW frequencies.

These high frequencies may have propagation characteristics unfavorable for wireless communication, especially in an outdoor environment. Higher frequency transmissions may experience higher, free space path loss. Rainfall and atmospheric gasses (such as oxygen and foliage) may add further attenuation compared to sub-6 GHz frequencies. In addition, penetration and diffraction attenuation may become more severe at higher frequencies, such as at mmW frequencies.

All these propagation characteristics may result in significant Non Line-Of-Sight (NLOS) propagation path losses. For example, at mmW frequencies, NLOS path losses may be more than 20 dB higher than Line-Of-Sight (LOS) path losses and severely limit the coverage of mmW transmissions.

SUMMARY

To increase throughput and maintain adequate coverage in higher frequency bands, New Radio (NR) systems use more UE antenna elements compared to legacy systems. With UEs using as many as 64 antenna elements, legacy approaches to control multi-antenna transmissions become impractical due to the overhead of transmitting up to 64 orthogonal reference signals and signaling precoders for up to 64 antenna ports. Exemplary embodiments allow a UE to determine a set of precoding weights and other parameters for uplink or sidelink transmissions.

Similarly, in the downlink direction, network equipment may be equipped with more antenna elements compared to legacy systems, causing current approaches to be impractical. Exemplary embodiments select pre-coding weights for reception (downlink or sidelink) as well as feedback to enable proper selection of pre-coding weights at the network side. Exemplary embodiments also enable other desired design features of NR, such as not relying on continuous transmissions of common downlink reference signals that result in low energy efficiency and limited spectrum efficiency.

Use of a narrow beam pattern in operation can cause the received energy to degrade abruptly during UE rotation and dynamic blocking. Disclosed herein are methods implemented by a UE to adjust the beam and manage the beam process when the channel varies abruptly due to the UE's own rotation or dynamic blockage during a system procedure or active data transmission/reception.

Beamforming and uplink control and data transmission techniques enable a UE to maintain at least one beam process for operation with multiple beams and/or points. A beam process may be indicated for transmission or reception over a downlink or uplink physical channel. Power, timing, and channel state information may be specific to a beam process. A beam process may be established as part of a random access procedure in which resources may be provisioned in random access response messages. Techniques are provided to handle beam process failures, to use beam processes for mobility, to select beams using open-loop and closed-loop selection procedures, for simultaneous beam process power allocation, for beam process maximum power back-off (MPR) e.g. caused by SAR, for beam re-selection due to MPR, and for beam re-selection and re-pairing due to UE rotation and dynamic blockage.

Systems and methods disclosed herein provide support for a large number of antenna elements at the UE side used in 5G NR as compared to legacy systems. Systems and methods disclosed herein further relate to efficient selection of pre-coding weights for UE reception and transmission. Exemplary beam-based NR systems and methods disclosed herein reduce reliance on continuous transmissions of common downlink reference signals in order to achieve energy efficiency and spectrum efficiency.

In an exemplary embodiment, for operation with one or more beams and/or points, the UE maintains one beam process per beam and/or point. A beam process may be indicated for transmission/reception over downlink or uplink physical channel. Power, timing, channel state information may be specific to a beam process. A beam process may be established as part of a random access procedure in which resources may be provisioned in a random access response. A UE may monitor link qualities that are specific to beam process and may declare link failure of beam process based on individual or aggregated beam qualities. AUE may handle mobility based on use of beam processes. AUE may perform beam selection procedures per beam process using (i) open loop, e.g. based on channel reciprocity and/or (ii) closed loop, e.g. based on beam measurement.

BRIEF DESCRIPTION OF THE DRAWINGS

A more detailed understanding may be had from the following description, presented by way of example in conjunction with the accompanying drawings.

FIG. 3A shows an example beam distribution pattern when the beam center direction is the same as the beam peak direction.

FIG. 3B shows an example beam distribution pattern when the beam center direction is not the same as the beam peak direction.

DETAILED DESCRIPTION

5G Beam-Based Radio Access

Figure 1:
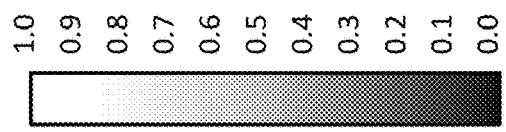
FIG. 1 depicts a three-dimensional graph for a beam pattern.
Figure 1:
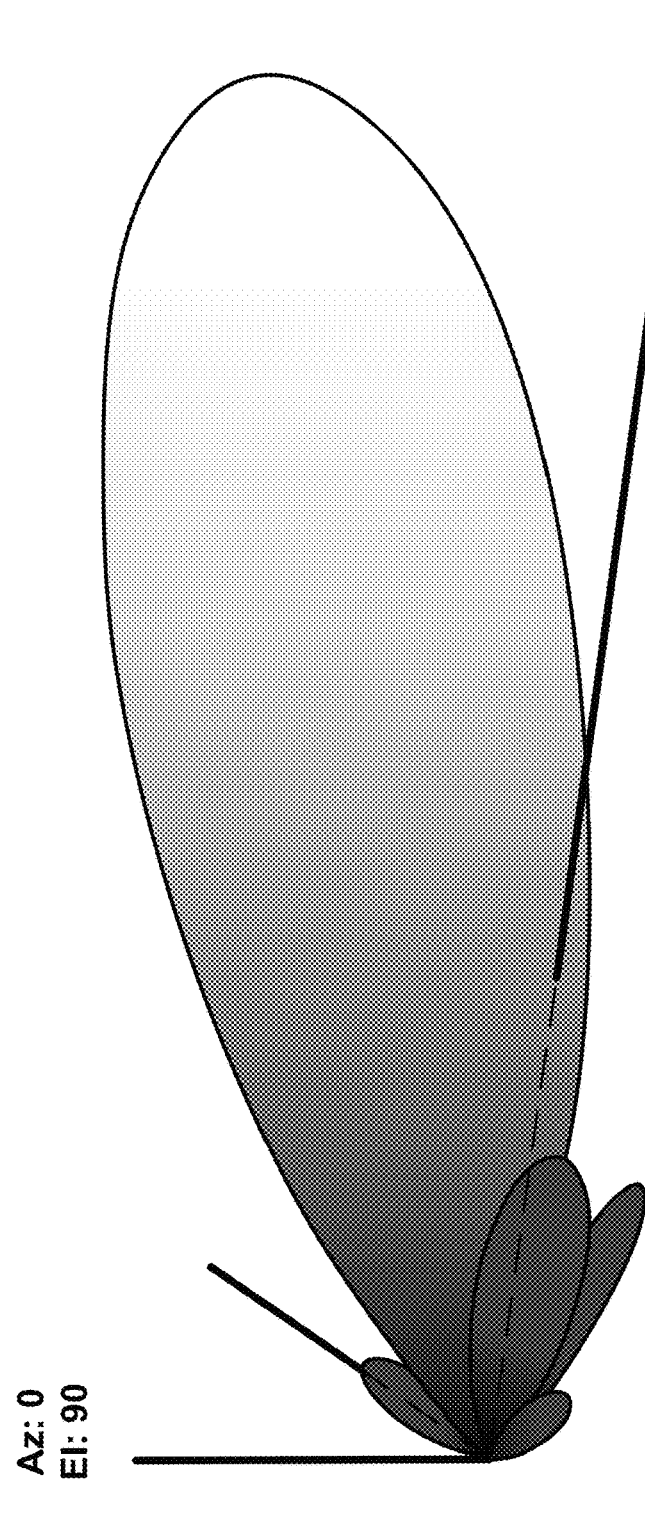

Recent channel measurements performed by the wireless industry and academia have demonstrated feasibility of satisfactory cellular coverage with the help of beamforming techniques. Measurement data shows that beamforming gains provide the coverage used for cellular control signaling and boost the link capacity to achieve higher data throughput in LOS conditions.

The channel propagation characteristics and the very high data throughput for 5G NR cellular systems may call for using beamforming on all physical layer signals and channels including those for broadcast and common purpose, and for focusing on beam-based or beam-centric procedures. The 5G NR system design may enable a beamformed access link with beamforming for most or all physical layer signals and channels. The physical layer signals and channels may apply different beamforming techniques, including digital, analog, and hybrid beamforming and may store its specific beamforming configuration.

Beamforming may provide an additional degree of freedom in the angular domain compared with conventional cellular systems. The system design may take into account the beamforming and beam-based features specific to each physical layer signal and channel and incorporate the corresponding control and system procedures (such as, uplink transmission, cell search, random access, and control channel decoding).

Beamforming Techniques

Beamforming techniques comprise digital, analog, and hybrid beamforming. For digital beamforming, each antenna element may have a dedicated RF chain, including RF processing and ADC/DAC. The signal processed by each antenna element may be controlled independently in phase and amplitude to optimize channel capacity. The number of RF chains may be equal to the number of antenna elements. While offering very high performance, digital beamforming techniques may come with high costs, implementation complexities, and high energy consumption.

Analog beamforming may apply one RF chain for a number of antenna elements that constitute a Phase Antenna Array (PAA). Each antenna element may use a phase shifter to set a phase-only weight for beamforming and steering of the antenna pattern of the PAA. The number of applied RF chains may be significantly lower than the number of antenna elements. The number of RF chains may be the same or lower than the number of PAAs. For example, multiple PAAs may be connected to a single RF chain, and each PAA may have an antenna pattern for a specific azimuth and elevation coverage. The RF chain may be switched to one PAA at a time to use a single RF chain with multiple PAAs to provide broad coverage by using one beam at a different direction and time instance.

Hybrid beamforming may combine digital precoding and analog beamforming. Analog beamforming may be performed over antenna elements of a PAA connected to an RF chain. Digital precoding may be applied to a baseband signal for each RF chain and its associated PAA. Configuration of hybrid beamforming may include a number of data streams, a number of RF chains, a number of PAAs, and a number of antenna elements. A PAA connected to an RF chain may be represented by an antenna port uniquely identified by a beamformed reference signal specific to such an antenna port.

FIG. 1 is a graph 100 of an exemplary UE three-dimensional transmit beam pattern using a 4×4 uniform linear array.

Figure 2:
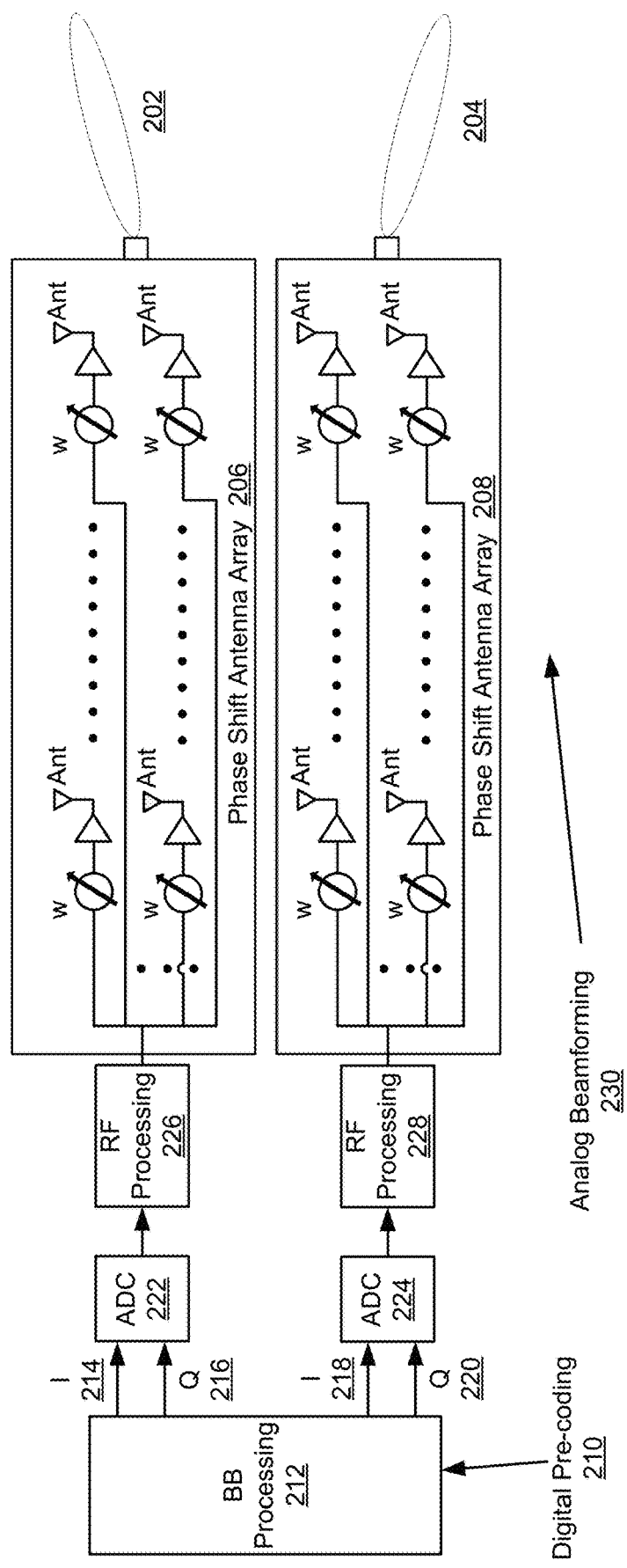
FIG. 2 depicts a functional block diagram for beam forming processes.

FIG. 2 shows an exemplary UE block diagram for a hybrid beamforming system 200 with two transmitters 202, 204 and two phase antennas 206, 208. It starts with digital pre-coding 210 in the BB processing block 212. The I (214, 218) and Q (216, 220) output signals pass through the ADC blocks 222, 224 and radio frequency processing blocks 226, 228 to be transmitted via a phase shift antenna array 206, 208 for analog beamforming.

High implementation costs and high energy consumption for digital beamforming techniques may lead to implementation considerations for NR system design. 5G NR beamforming techniques may be based on hybrid beamforming with the number of 5G NR transceiver nodes considerably lower than the number of antenna elements. Analog beamforming techniques may have significant impact on L1/L23 system procedures and lead to new procedural behaviors and sequences. Beamformed transmission may offer a high degree of flexibility to the eNB to customize the transmission both in the time and spatial domains to reduce signal overhead and energy consumption.

LTE/LTE-A Uplink Multi-Antenna Techniques

LTE and LTE-A allow for multi-antenna techniques. For transmit antenna selection, open loop antenna selection masks scrambling over uplink grant CRC bits. Close loop transmit antenna selection is configured by higher layers based on an optional UE capability report. The Spatial Orthogonal Resource Transmit Diversity (SORTD) method is the same as UCI over different UE antennas using different orthogonal resources. For PUCCH, it uses a dual antenna. For MU-MMO, up to eight UEs on the same set of RBs each use a single antenna transmission. Also, a 3-bit PUSCH cyclic shift and an OCC for PUSCH DMRS provides orthogonality. The MU-MMO method is transparent to a UE. For SU-MIMO, there is a precoder with CM preserving constraints (for example, one layer per antenna). Also, eNB selects a precoder based on a non-precoded SRS and signals the number of layers and PMI using DCI 4. The SU-MIMO method uses an SRS per antenna port.

Control of Uplink Transmissions

Wireless systems employ mechanisms controlling transmissions from a UE (such as uplink or sidelink) to ensure proper link adaptation while preventing excessive interference to other UEs. Such mechanisms include, for example, transmit power control, timing alignment, and transmission parameter indicators, such as modulation, coding, and frequency allocation. In LTE, a UE equipped with multiple antenna elements may also be indicated by precoding weights to apply for a transmission. This mechanism may use a UE transmitting a reference signal for every antenna element to determine a precoder that maximizes quality at the receiver side. Use of such a precoder may enable reduction of transmission power for a given transmission and thus naturally reduces interference to the system. In LTE, the maximum number of reference signals (or antenna ports) for uplink transmissions is 4.

UE Autonomous Rotation and Blockage Detection

It is not common for a UE to be equipped with a variety of motion sensors including accelerometer, gravity sensor, gyroscope, rotation vector sensor, etc. The accelerometer and gyroscope are hardware-based and other software-based sensors can derive further motion data based on the input received from the two hardware-based sensors.

The sensor data provide the UE with detailed detection information on UE rotational movement. The rotational movement can be a reflection of direct user input such as tilt, shake, rotation or swing motions of a UE during video game play. The detected rotation data allows the UE to calculate an angular change in the orientation of its own antenna array. The orientation change can be denoted using a rate of rotation around the X/Y/Z axes and a respective vector component along each axis.

The motion sensors of the UE can collect data that results from relative movements. Relative movements can provide a reflection of the physical environment in which the UE is located. For example, in some embodiments, the motion sensors can detect the approaching of a stationary obstacle due to the UE's movement or the movement of a moving obstacle toward the stationary UE. In such embodiments, the motion sensor data enables the UE to detect an upcoming blockage and estimate the blockage's translational movement vector including its speed and direction relative to the UE.

In exemplary embodiments, advanced motion sensors may operate to discriminate between a human body and inert material. In such embodiments, the UE thus is able to detect not only an approaching blockage but also to distinguish whether the blockage is a human body. This feature may be used by the UE to comply with Specific Absorption Rate (SAR) regulation for handset devices.

Beams

The term "beam" may be used in the specification in several different contexts. Beam may be used to mean a set of pre-coding weights or co-phasing weights applied to antenna elements in user equipment (UE) or network equipment (e.g., transmission or reception point) for transmission or reception. The term beam may also refer to an antenna or radiation pattern resulting from the application of such pre-coding weights or to at least one reference signal transmitted while applying the set of pre-coding weights to the antenna elements; at least one sequence used for the generation of the at least one reference signal. Other references include to a set of properties associated to this antenna pattern, such as a gain, directivity, beam width, beam direction (with respect to a plane of reference) in terms of azimuth and elevation, peak to side lobe ratio or to at least one antenna port associated to such an antenna pattern. Additionally, the term beam may refer to an associated number and/or configuration of antenna elements (e.g., a uniform linear array, a uniform rectangular array, or other uniform array).

Beam Processes

A beam class refers to beams that share at least on characteristic, such as beam width or beam solid angle. A higher beam class refers to a higher level of directivity, while a lower beam class refers to a lower level of directivity. A beam family consists of all beams of the same beam class. A beam group is a set of beams associated to a beam of a lower beam class. A beam may be associated to a beam of a lower beam class based on, for example, a beam with the closest center direction or a beam with largest overlap or correlation.

FIGS. 3A and 3B are two graphs 300, 350 of beam amplitude vs. direction 308, 316 that illustrate a distinction between a beam's center direction 304, 314 and a beam's peak direction 306, 312. Beam direction is the direction of the beam, which may be defined as the beam's center direction 304, 314 or as the beam's peak direction 306, 312. FIGS. 3A and 3B also indicate EIRP Peak 302, 310 with a black dot. Beam space is the area or solid angle covered by a set of beams, which may have an arbitrary weight vector. The beam space may be bounded or defined by a set of parameters, such as a set of angles or a beam itself.

In some exemplary embodiments, a UE may set pre-coding weights and other parameters for transmission and/or reception of signals, control and data according to at least one beam process. A UE may calculate or modify values for such parameters and use these values in subsequent transmissions or receptions referencing a beam process using, for instance, a beam process identity. Such an exemplary process greatly reduces the overhead associated with the determination of pre-coding weights as it does not rely on continuous transmission of reference signals and does not involve signaling of pre-coding for every transmission. Such an exemplary process also reduces the implementation complexity for advanced transmission schemes, such as spatial multiplexing, beam diversity, or coordinated multi-point through the use of more than one beam process. A beam process may be referred to as a beam pair link (BPL).

For a transmission from a UE, a beam process may determine at least one set of pre-coding or co-phasing weights to apply to antenna elements. Such a determination may form a beam, where each such set may correspond to an antenna port. A transmission beam process may determine a timing advance with respect to a downlink timing reference signal, or a transmission power level. For a reception from a UE, a beam process may determine at least one set of pre-coding weights to apply to antenna elements for reception. Again, such a determination may form a beam, where each such set may correspond to an antenna port. A beam process may also determine settings for an automatic gain controller (AGC).

In some exemplary embodiments, a bi-directional beam process may control both transmission and reception and may determine distinct sets of pre-coding weights or beams for transmission and reception. Alternatively, a beam process may control only transmission (a transmit, or UL, beam process) or only reception (a receive, or DL, beam process).

A UE may determine that the beams used in reception and transmission in a receive and a transmit beam process respectively, or in a bi-directional beam process, should have the same pattern or a similar pattern. Such determination may be based on higher layer signaling, or the determination may be implicitly based on frequency band or another property of a system that the UE is accessing or to which the UE is connected. In such a case, the UE may derive the pre-coding weights used in transmission based on the pre-coding weights determined for reception, or vice-versa. In the case of transmit and receive beam processes, such processes may then be referred to as being associated by reciprocity. In the case of a bi-directional beam process, the process may be referred to as being reciprocal.

In some embodiments, a default beam process may be defined. Such a default beam process may be applied for downlink or uplink transmissions in the absence of a specific configuration, or the default beam process may be determined from higher layer signaling. Such default beam process may be pre-defined, such that the resulting maximum beam gain or directivity is minimized, or such that the pattern is approximately omnidirectional.

The use of a default beam process may also depend on the frequency band, for example according to a pre-determined rule or higher layer signaling. For example, whether a PRACH transmission should use a default beam process may be indicated as part of a RACH configuration, which may be provided by system information. Such signaling may be beneficial in cases where the network uses synchronized transmissions from multiple TRPs for the transmission of signals used by the UE for system timing and path loss estimation.

A UE may maintain one beam for each beam process. Such a beam may be selected initially and updated as part of a beam selection procedure. A beam selection procedure determines a beam that results in the best propagation channel (e.g., by maximizing received signal power for a given transmission power) for a given beam or antenna applied to another UE (e.g., a network node).

Figure 4:
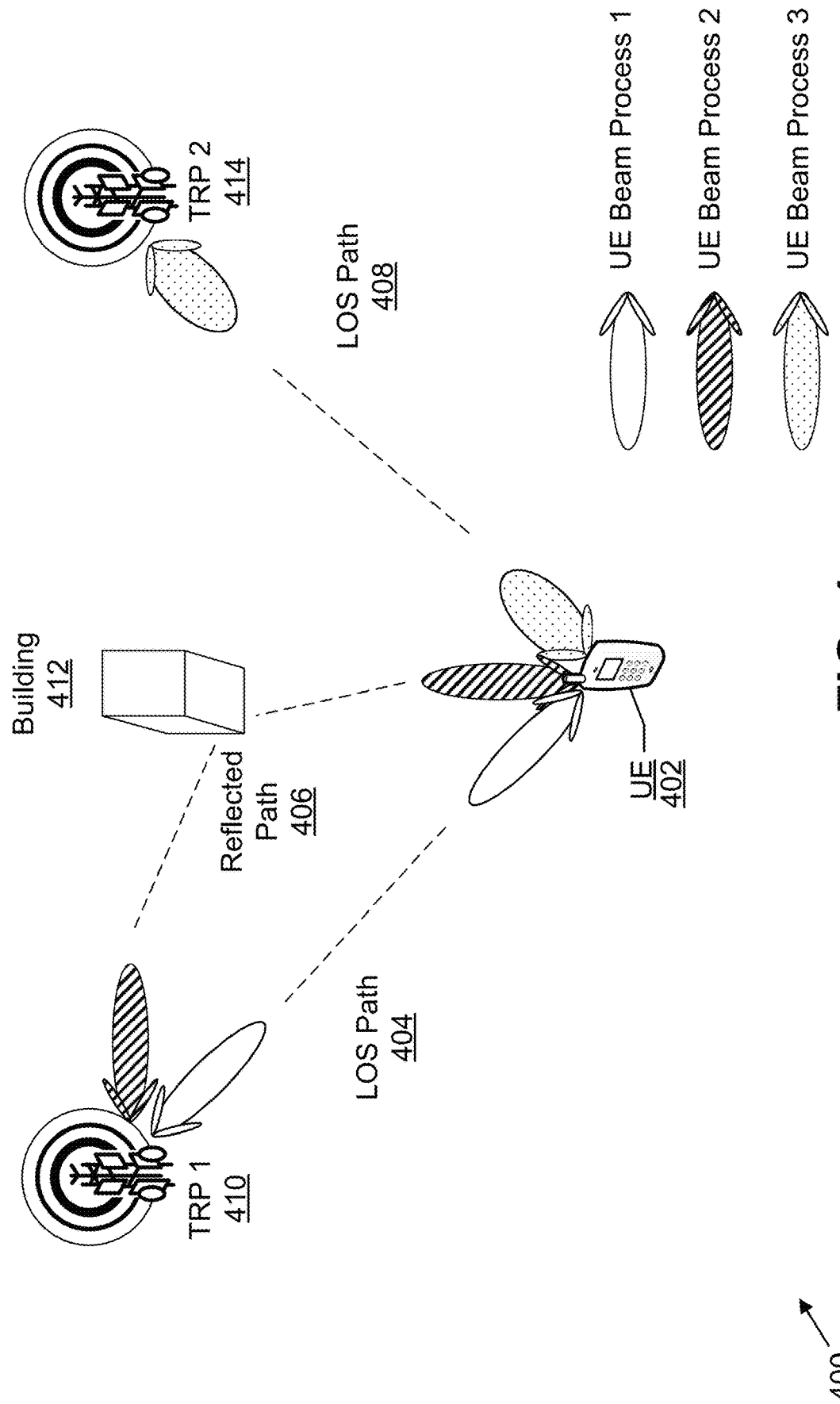
FIG. 4 is a schematic diagram of an exemplary embodiment of beam propagation.

FIG. 4 shows an exemplary embodiment of beam propagation in a system 400. At any one time, a UE 402 may be configured with multiple beam processes to support spatial diversity or multiplexing, multi-point operation and mobility. This is illustrated in FIG. 4, where processes 1 and 2 correspond to direct path 404 and reflected path 406 to TRP 1 (410) and process 3 corresponds to a path 408 to TRP 2 (414). The reflected path 406 reflects off building 412, while the direct paths 404, 408 are line of sight. Each configured beam process may be seen as corresponding to a transmission or reception instance with a specific antenna pattern that maximizes the beamforming gain along a channel path. Multiple beam processes could also be used to support different levels of beamforming depending on the type of information being transmitted and associated reliability requirements or depending on whether the transmission is unicast or multicast.

A current beam refers to a beam selection procedure's latest outcome. For bi-directional processes, a current beam may apply to both transmission and reception. Alternatively, separate current beams may be applied for transmission and reception. Similarly, a beam selection procedure may select a separate beam for each antenna port, resulting in current beams for each antenna port.

In some exemplary embodiments, when a beam process is applied to transmission or reception, the applied beam corresponds to the current beam. In some exemplary embodiments, a UE 402 may maintain beams selected in previous beam selection procedures. For example, a UE 402 may maintain the latest selected beam of a certain beam class, only if such beam class (or beam gain) is lower than the beam class (or beam gain) of the current beam. When maintaining multiple beams for a beam process, each beam may be associated with a beam identity, which may correspond to a beam class.

Some beam selection procedures may be based on performing a series of measurements taken from a downlink reference signal. Such a reference signal is referred to herein as a beam selection reference signal. In some embodiments, a UE 402 may adjust settings for an AGC based on such beam selection reference signal. A beam process may be provisioned with resources for at least one such beam selection reference signal. The resources for provisioning the beam process reference signal may include at least one identity parameter used for generating the sequence as well as an indication of the time and frequency resources. For some exemplary embodiments, the identity parameter may be unique to a beam process.

Some exemplary beam selection procedures may be based on performing at least one transmission of an uplink (or sounding) reference signal, referred to as a beam sounding reference signal. A beam process may be provisioned with resources for at least one such beam sounding reference signal. The resources for provisioning the beam sounding reference signal may include at least one identity parameter used for generating the sequence as well as an indication of the time and frequency resources. For some exemplary embodiments, an identity parameter may be unique to a beam process. Also, an identity parameter for uplink may be the same as the identity parameter used to generate the beam selection reference signal.

In some exemplary embodiments, resources for beam selection reference signals and beam sounding reference signals may be allocated dynamically. Additionally, these reference signals may be allocated over a subset of available time and frequency resources. Such allocations may be made to avoid continuous broadcasting of signals and to reduce high overhead costs. For example, downlink control information (such as a random access response or signaling triggering a beam selection procedure) or a combination of downlink control information and higher layer signaling may indicate resource allocations.

A beam select reference signal may be associated with a set of parameters used for spreading or scrambling. The parameters may include, e.g., spreading factor, index of the spreading sequence for example OVSF and Walsh code and scrambling sequence index.

As described below, various resources may be associated with beam a process for data transmission/reception.

A beam process for data transmission/reception may be associated with time domain resources including, for example, time unit, block of symbols, sub-frames, slots and frames. The beam process may also be associated with a set of frequency domain resources including, for example, sub-carriers, block of sub-carriers, resource block, set of resource blocks and wide band carrier. The beam process may be associated with code domain resources including, for example, type of spreading and/or scrambling code (OVSF/Walsh/ZC codes), length of the spreading/scrambling and indices of the spreading/scrambling sequences.

The time/frequency/code resource associated with a beam process may be static and pre-configured for certain type of beam process. For example, the resources associated with a beam process used for a cell-specific common control channel in some embodiments may be fixed and broadcast in the system information broadcast transmission. In other embodiments, such a beam process may have fixed and pre-defined resource allocation. The beam process for both data transmission and reception may also be associated with the resource dynamically using downlink control information in physical layer control signaling. In another embodiment, the resource association information per beam process may be carried in higher layer signaling such as RRC signaling.

The association of beam process with the resource allocation may enable flexible configuration and reduced signaling overhead for beam processes connected to multiple TRPs or used for hierarchical control channels for the downlink/uplink/sidelink.

A UE 402 may be configured to maintain more than one beam process (such as a bi-directional or unidirectional process) (see FIG. 4). Each such beam process may correspond to reception or transmission for a specific antenna pattern, such that patterns of different beam processes maximize antenna gain in different directions. Thus, for each beam process the UE 402 may maintain precoding weights, Tx power, and timing. Each beam process may be associated with different network transmission points, e.g., TRPs. The connection with multiple TRPs may enable support of multi-point operation, diversity, seamless mobility, and fallback operations. Maintenance of more than one such beam process may facilitate transmission and/or reception to and/or from multiple points or to a single point using different beams.

A beam process may be configured with a beam process identity for referencing purposes. A particular beam process may be designated as a primary beam process or master beam process. If a UE 402 maintains only one beam process, such a beam process may be designated as the primary (or master) beam process. If a UE 402 maintains more than one beam process, then a UE 402 may receive signaling to designate the primary beam process.

Control Channel Monitoring

In some exemplary embodiments, the UE 402 may determine at least one beam process for decoding a downlink control channel, such as a physical downlink control channel or a physical broadcast channel. When attempting to decode a downlink control channel, the UE 402 may use pre-coding weights determined by the beam process for reception.

In one embodiment, a beam process is associated to at least one control channel configuration from which the UE 402 determines resources on which to attempt decoding downlink control information. The configuration may include at least one of the following:

At least one control resource set, control sub-band, or control time symbols within a scheduling unit such as a slot, mini-slot, or subframe.

At least one parameter used for deriving at least one search space (or set of candidates) for instances of the control channel within the at least one control resource set.

The at least one search space may be defined in terms of at least control channel elements, resource element groups, sets of time symbols, and/or subset of physical resource blocks within a control resource set.

At least one beam process may be associated with a common search space.

At least one parameter used to determine a subset of possible scheduling units (e.g., slots) in which downlink control information transmitted using the beam process may be present, such as period and offset in units of slot (or mini-slot). In some embodiments, there may be more than one configured such subset, which may be selected based on an activity state or priority associated to the beam process.

At least one parameter used for determining at least one property of a reference signal, such as a sequence, used for at least the purpose of decoding a control channel.

The configuration may be obtained from RRC signaling, such as dedicated signaling and/or system information from at least a physical broadcast channel.

Independent Configurations and Example Usage Scenarios

Each beam process may be configured or associated with independent control channel configurations for maximum flexibility. For example, the control sub-band or resource set may be configured differently between different beam processes, which may be useful in scenarios where they are associated to geographically separated TRPs which use different resources for control channels to better coordinate interference.

In another example, the time symbol within a slot may be differently configured, which may be useful in scenarios where uplink and downlink data transmissions involve different TRPs (e.g., hetnet scenarios with low and high transmission power TRPs). In such a scenario, a downlink assignment may be received from a first TRP using a first beam process, and an uplink grant may be received from a second TRP using a second beam process.

In some embodiments, to reduce signaling overhead, at least one parameter of the control channel configuration may be common to all beam processes.

Prioritization Between Beam Processes

In certain situations, there may be overlap between resources used by different beam processes, such that reception using at least one such beam process is not feasible. For example, this may occur if the UE 402 is only capable of receiving using at most N beam processes at a given time (where N may correspond to, e.g., a number of RF chains in the UE receiver implementation), and there is overlap in the time domain between control channel candidates of more than N beam processes in a given slot. In another example, a control channel candidate for a first beam process may overlap with a scheduled transmission for a second beam process. When such a situation occurs, the UE 402 may apply a prioritization rule between beam processes based on at least one of the following criteria:

A configured priority associated to each beam process. For example, the UE 402 may prioritize reception of the control channel for a primary beam process, or based on an index associated to the beam process (e.g., lower index has higher priority).

An activity state associated to each beam process. For example, a beam process in an "active" state may be prioritized over a beam process in an "inactive" state; alternatively, a beam process in an "inactive" state may be prioritized to provide a fallback mechanism in case quality for a beam process in active state has degraded.

A periodicity for the subset of scheduling units when a control channel is monitored for the beam process. For example, priority may be given to the beam process that has the largest periodicity.

The latest reported channel state indication for each beam process. For example, priority may be given to the beam process for which the channel quality indication was the highest.

The type of transmission associated to the beam process. For example, a scheduled transmission for a first beam process may have priority over a control channel candidate for a second beam process. In another example, such scheduled transmission may have been scheduled in a previous slot and overlap with the control resource set of the current slot.

Multiple rules may be used to handle instances where one rule does not allow differentiation. For example, the UE 402 may first prioritize based on activity state, and if more than one process has the same activity state, a rule based on configured priority may be used. Alternatively, other conditional orderings of rules may be utilized.

Relationship with Antenna Port

For some exemplary embodiments, a fixed or semi-static association between a beam process and an antenna port or set of antenna ports may be established. A UE 402 applies the corresponding beam process' pre-coding weights whenever configured to transmit or receive over an antenna port. A set of antenna port(s) associated with a beam process may be spatially quasi co-located with one another. For example, if an association is defined between an antenna port over which a demodulation reference is transmitted and an antenna port over which a reference signal used for beam selection is transmitted for the beam process (such as a CSI-RS or a beam selection RS), the association may indicate that such antenna ports are spatially quasi co-located. Thus, an implicit or explicit indication of a beam process for reception using an antenna port may be equivalent to an indication that this antenna port is spatially quasi co-located with a reference signal (e.g., CSI-RS) of the beam process or beam pair link. Alternatively, for some exemplary embodiments, associations between a beam process and an antenna port may be modified dynamically. A UE 402 may determine an applicable beam process to transmit or receive over an antenna port.

In one exemplary embodiment, an applicable beam process may be determined from an explicit indication received from physical or higher layer signaling. For example, a UE 402 may receive downlink control information (DCI) indicating an uplink (or sidelink) transmission (a grant) over an uplink (or sidelink) physical channel, and such a grant may contain an indication of an applicable beam process for transmission over each antenna port. Such a beam process may be different from the beam process used for receiving the DCI. In another exemplary embodiment, a UE 402 may receive downlink control information indicating a downlink assignment for reception from a downlink physical channel, and such assignment may contain an indication of an applicable beam process for reception over each antenna port. In yet another exemplary embodiment, a UE 402 may receive a MAC control element or an RRC message indicating an applicable beam process for transmission or reception over each antenna port for subsequent transmission or reception over an uplink, sidelink or downlink physical channel.

In another exemplary embodiment, the applicable beam process may be implicitly determined based on the beam process used for decoding an associated transmission. For example, the applicable beam process for a downlink transmission may correspond to the beam process used for decoding the DCI indicating this downlink transmission from a downlink physical control channel. In some cases, the downlink transmission may be a downlink physical data channel, a second downlink physical control channel or a downlink signal such as DM-RS or CSI-RS. In another example, the applicable beam process for an uplink transmission (e.g., uplink physical channel or signal) may correspond to the beam process used for decoding the DCI indicating or triggering this uplink transmission. In particular: the applicable beam process for an uplink control channel containing HARQ-ACK feedback associated to a downlink data transmission may correspond to the beam process used to decode the DCI indicating transmission of this downlink data; and/or the applicable beam process for an uplink control (or data) channel containing a CSI report may correspond to the beam process used to decode the DCI indicating transmission of the reference signal(s), e.g., CSI-RS, from which the report is derived. In another example, the applicable beam process for an uplink control channel containing HARQ-ACK for a downlink transmission may correspond to the beam process used for decoding the downlink transmission. In another example, the applicable beam process for a random access response may correspond to the beam process used for transmitting the random access preamble.

In the above examples, the correspondence between beam process may be that both processes are identical (e.g., for a bi-directional beam process), or that both beam processes are associated by reciprocity.

Alternatively, in some embodiments, the correspondence may be configured by physical or higher layer signaling. For example, the applicable beam process for a UL data transmission when a certain beam process is used for decoding the DCI indicating this transmission may be configured by RRC signaling. Such embodiments may allow transmission and reception from different network TRPs, which may be advantageous in heterogeneous deployments where the best node for downlink transmission may be a high power TRP, while the best node for uplink transmission may be a (closer) low power TRP. In another example, the applicable beam process for a random access response may be configured to correspond to a default beam process (e.g., omnidirectional beam) is so configured as part of a RACH configuration. Such a configuration may allow synchronized transmission of the random access response from multiple TRPs.

In another example, the correspondence may be obtained more dynamically, such as by MAC signaling or physical layer signaling. Such embodiments may allow the use of different beam processes (e.g., with beams in different directions) for control or data reception on the one hand, and data transmission on the other. This may be beneficial if the configured maximum transmission power for a certain beam process is lower than for another beam process, such that the best beam process for downlink reception is not the beam allowing for best performance for uplink transmission. Such a situation may occur, for example, due to SAR requirements impacting some beam processes more than others. In such a case, for example, the UE 402 may inform the network of the different configured maximum transmission powers by the transmission of power headroom report(s) triggered by change of power management maximum power reduction (P-MPR) for at least one beam process.

In another embodiment, the applicable beam process may be implicitly determined based on the time and/or frequency resources occupied by the transmission. The correspondence between resources and beam process may be provided by higher layer signaling.

In another exemplary embodiment, an applicable beam process may be determined based on the physical channel or signal type for which a transmission or reception takes place.

In another exemplary embodiment, an applicable beam process may be determined based on the type and/or contents of the transmission, such as whether the transmission consists of control information (e.g., uplink or sidelink) or higher layer data, or whether the transmission is multicast or unicast (e.g., for sidelink transmissions). For example, transmission of a scheduling request may be performed using a specific beam process, such as a primary beam process.

When maintaining multiple beams for a beam process, similar embodiments to ones described above may be used to determine which beam identity applies to a specific transmission. For some embodiments, a sequence used for generation of a demodulation reference signal may be specific to a beam process. Such a sequence may be generated using an identity parameter which matches an identity parameter used for generation of a sequence for a beam selection or beam sounding reference signal.

Beam Correspondence Determination

In some embodiments, a UE 402 may determine a correspondence between a beam used for transmission (a transmit beam or uplink beam) and a beam used for reception (a receive beam or downlink beam), for at least one pair of a transmit beam and a receive beam. If such correspondence is determined, a UE 402 may determine that a transmit beam that is used for a first transmission from the UE 402 is a transmit beam corresponding to a reception beam used for receiving a second transmission. Such a receive beam may correspond to a receive beam that maximizes signal strength or quality when used to receive the second transmission. The following paragraphs describe such embodiments.

Pre-Determined or Static Beam Correspondence

In one embodiment, a beam correspondence may be pre-determined for at least a subset of all transmit and receive beams according to a mapping stored in memory. A mapping may be performed as part of a calibration or testing procedure. A mapping may be such that the difference in radiation pattern (or a property thereof, such as a direction where gain is maximized) between a transmit beam and its corresponding receive beam is minimized. A mapping may also be such that the pre-coding weights used for transmit and receive beams have identical or approximately the same values.

Dynamic Beam Correspondence State

In some embodiments, beam correspondence between a transmit beam and a receive beam may not exist consistently due to implementation conditions (e.g., difference in TX and RX RF path) and/or operational conditions (e.g., temperature change, reference clock phase drift), such that determination of beam correspondence is dynamic.

A dynamic beam correspondence state may be denoted with in-state and out-of-state. A beam correspondence state may be specific to an individual beam, beam type, beam class, beam group, or antenna panel or to a set of beams, beam types, beam classes, beam groups or antenna panels. A UE 402 may be configured with a beam correspondence update period and may evaluate and update beam correspondence periodically according to an update configuration. A UE 402 may perform a beam correspondence state update in response to receiving L1 control or higher layer (MAC, RRC) signaling from the network. In another embodiment, a UE 402 may trigger a beam correspondence update upon pre-defined events, which may include one or more of the following procedures:

Re-configuration of a new beam, beam type, beam class, beam group, or antenna panel;
During or at the end of a RACH procedure, e.g., by incorporating update procedure steps in Msg1 and/or Msg3 transmissions; or
Configuration of a UL beam management procedure. The network may decide if the UL beam management may be configured depending on the beam correspondence state. The network may not configure any such procedure, e.g., U1, U2, or U3 if the beam correspondence state is in-state.

In one embodiment, a UE 402 may update a beam correspondence state by evaluating a transmit beam and corresponding receive beam radiation pattern and comparing/correlating the pattern parameters such as peak lobe direction, 3-dB main lobe width, side lobe direction, side lobe width, side lobe suppression ratio, etc. The comparison and evaluation criteria may be pre-defined.

In another embodiment, a UE 402 may update the beam correspondence using a beam correspondence update procedure. In one embodiment, a UE 402 may perform the following actions:

Transmit beam-specific reference signal, e.g., SRS using uplink beam sweeping based on a set of uplink transmit beams;
Monitor downlink control information in all receive beams corresponding to uplink transmit beams, where downlink control information may include the best uplink transmit beam identity e.g., beam index or SRS resource indication (SRI);
Receive the downlink control information in one receive beam or multiple receive beams (e.g., when a UE 402 is located in the middle of two downlink beams) and verify if the best receive beam may correspond to the uplink transmit beam identity received in the downlink control information;
Determine a beam correspondence in-state if the verification result is a match and out-of-state if the verification result is not a match; and
Report the beam correspondence state using uplink control signaling.

In another embodiment, a UE 402 may perform the following actions:

Transmit in a first transmission using a beam-specific reference signal, e.g., via SRS in an uplink beam corresponding to the best downlink beam (e.g., based on an SS block), where the SRS resource/sequence may carry indication of the best SS block;
Transmit a second transmission using an uplink beam sweeping based on a set of uplink transmit beams with beam-specific signals, e.g., SRS including the one used in the first transmission; and
Receive a beam correspondence in-state or out-of-state indication in downlink L1 control signaling by the network.

For this embodiment, the network may determine the beam correspondence state by verifying if the first SRS is the same as the best SRS received in the second transmission. Note, the network may use the receive beam corresponding to the indicated best SS block in both the first and second UE transmissions.

A UE 402 may be configured to perform UL beam management procedure (U1/U2/U3) when UE beam correspondence state is out-of-state. For this embodiment, the UE 402 may be configured with an explicit association between uplink and downlink beams.

A UE 402 may receive an indication in L1 control signaling or a higher layer dedicated signal to select an uplink beam based on a downlink beam without a UL beam management procedure when the UE beam correspondence state is in-state. For this embodiment, a UE 402 may maintain an implicit uplink and downlink beam association.

In another embodiment, a UE 402 may determine beam correspondence based on an indication from the network. Such an embodiment may be applicable, for example if beam correspondence already exists at the network side. A UE 402 may first transmit a sequence of beam-specific reference signals (e.g., SRS) for at least one beam (e.g., a beam sweep). Such transmissions may be triggered by signaling from the network at physical or higher layers. A UE 402 may subsequently receive an indication of a transmit beam, for example using an SRS indicator, along with an indication of a CSI-RS (or CSI-RS indicator) corresponding to a certain downlink transmit beam. Such indications may be contained in the same instance of physical layer signaling (downlink control information), MAC signaling (MAC control element), or RRC message. Indications may be combined with an indication that a CSI-RS will be transmitted at a certain time. If receiving the indicated CSI-RS, the UE 402 may determine a receive beam that maximizes signal quality. A UE 402 may determine that beam correspondence exists between this receive beam and a transmit beam used for transmission of the SRS indicated by the network.

Power Control—Open Loop Component

In some exemplary embodiments, transmission power may be dependent on a beam process applicable to a transmission.

Transmission power may be a function of a path loss measurement taken on a downlink reference signal. Such a downlink reference signal may be referred to as a beam path loss reference signal. Resources for such beam path loss reference signal may be allocated independently for each beam process. In some exemplary embodiments, a beam path loss reference signal may match a beam selection reference signal. A path loss measurement PL may be defined as the difference (in dB terms) between a reference transmission power Pref and a received signal power Pr when applying a current beam.

The beam used for the measurement may be the receive beam at least for a reciprocal bi-directional beam process, or may correspond to a receive beam process associated to the transmit beam process by reciprocity. Alternatively, the beam used for the measurement may be a pre-defined beam, such as an omnidirectional beam or a default beam. Alternatively, the UE may select a receive beam or beam process that minimizes the estimated path loss or maximizes the received signal.

Alternatively, the receive beam used for the path loss measurement may be determined from signaling. For example, the receive beam or whether the UE 402 should use a default beam process or select a beam process may be signaled from system information. Such embodiments may be used, for example, for determining the path loss estimate and transmission power for a PRACH transmission.

For some exemplary embodiments, a path loss measurement may be adjusted by a gain or directivity Gb of a beam used for taking a measurement. Expressed as an equation, a path loss measurement PL may be calculated as:

$$PL = P_{ref} - P_r + G_b,$$

where $P_{ref}$ and $P_r$ may be in dBm, while PL and $G_b$ may be in dB. This adjustment may allow for proper compensation of any difference in gain (or directivity) between a beam used for taking a path loss measurement and a beam used in a subsequent transmission. For this latter case, transmission power for a beam with gain $G_b'$ may be set as a function of $(PL-G_b')$, where PL and $G_b'$ are in dB. In some embodiments, a path loss measurement PL may not be adjusted and may be equal to $(P_{ref}-P_r)$ but transmission power may be set as a function of $PL+G_b-G_r$.

Power Control—Closed Loop Component

A UE 402 may receive signaling to perform adjustments to the power applied to certain transmissions (transmit power control (TPC) commands). Such adjustments may be cumulative on a per-beam process basis (apply to all subsequent transmissions for which a specific beam process applies). The beam process may be identified explicitly along with the TPC command, or implicitly based on the beam process corresponding to the transmission to which the TPC command applies. The value of the adjustment steps may also be configured independently for each beam process.

Power Control—Configured Maximum Power ($P_{cmax}$)

In some embodiments, the UE 402 may apply a configured maximum power (e.g. a $P_{cmax}$) for each beam process based on at least a maximum power reduction parameter (e.g. MPR, A-MPR or P-MPR), where the $P_{cmax}$ and maximum power reduction parameter may be different between beam processes. For example, this may be due to beam-specific power management MPR (P-MPR) values from specific absorption rate (SAR).

Configured Maximum Gain or Configured Maximum EIRP

In some embodiments, the UE 402 may operate to limit the gain of a beam with respect to the maximum possible gain considering the antenna configuration. Such situation may arise, for example, when the UE 402 is operating to meet specific absorption rate requirements.

The configuration parameters may include for example EIRP, maximum gain (Gmax) and maximum directivity. The parameters may be based on the UE 402 capability reporting regarding the UE antenna array beamforming configuration and capability. The eNB may configure the parameter using higher layer signaling. In another solution, the UE 402 may autonomously set the maximum gain or directivity.

The UE 402 may operate to maximize EIRP using both Pcmax and maximum gain parameter on a per beam process basis. The Gmax parameters may be impacted by the physical channel associated with the beam process. For example, a beam process for uplink control information (UCI) transmission in a physical layer uplink control channel may have a lower Gmax specified. Accordingly, the UE may transmit the UCI in a beam process with a wide beamwidth. The advantage may to increase the reliability and robustness of UCI transmission.

A UE may report, per beam process, the offset between the actively applied beamforming gain and the configured maximum gain. The difference may be caused by MPR for example caused by SAR. The eNB may receive the Gmax offset and trigger an uplink beam re-selection procedure for the associated beam process. Such embodiments may allow the eNB to flexibly adjust the uplink reception based on the beamwidth and beamforming gain used for the beam process.

Power Allocation of Simultaneous Beam Processes Connected to Different TRP

A UE 402 may add a beam process to associate with and transmit to a different TRP in a mobility event. The association may include uplink beam power control information specific to the new TRP. The UE 402 may receive power control configuration parameters of the new TRP including uplink SINR target and TRP reference signal power. The UE 402 may also receive new TRP's configuration of waveform and numerology and derive accordingly the required initial power and power step.

The UE may provide the new TRP with power headroom information computed for the associated beam process. The computation may consider transmission of all simultaneous transmissions of all active beam processes maintained by the UE 402. The power headroom thus may include fields for beam process identity and its corresponding power headroom value.

In embodiments where the TRPs are synchronized, the transmissions may be code multiplexed over the same frequency resources.

In another embodiment, the UE 402 may be configured with gaps on one TRP link if the TRPs are not synchronized or are deployed on inter-frequency or inter-band in order to facilitate and maximize the power transmissions capabilities. This may be useful during mobility events in non-synchronized TRPs (FDD case for example).

The gaps can be configured by the network upon a UE signaling event based on current link(s) quality for example. These gap patterns may have different lengths and have a finite duration with the goal of having the UE 402 reporting measurements and then the network may determine which TRP to use and may send a configuration massage or an indication that the UE can start monitoring certain control channels on certain TRPs for scheduling or an indication for UL transmission start point with the appropriate parameters.

The UE 402 may not rely on configured gaps if it has more than 1 transceivers chains capability. In this particular case, synchronous or asynchronous reception/transmissions may be available, while the network signaling will be reduced to target TRPs measurements indication and indicating the target TRP(s) after receiving a measurement report from the UE 402. The target TRP measurement configuration may a triggered message based on a quality threshold UE 402 triggered report. In this situation the output power is shared between these UL transmissions into a similar way to Carrier aggregation or Dual Connectivity Pcmax definition. However, if a deployment specific situation occurs where power sharing would not be a good outcome, then the network may configure gaps on the serving TRP in order to allow for a simultaneous connection with the target TRP. In this case the gaps decision may be based on the reported measurements from UE 402 where the pathloss estimate may show a possible scaling on the target TRP UL while maintaining the serving one.

Transmission Timing for a Beam Process

In some exemplary embodiments, a transmission's timing may be dependent on the applicable beam process. A UE 402 may determine a transmission's timing based on the timing of a downlink received signal, which may be referred to as a beam timing reference signal. Resources for such beam timing reference signal may be provisioned independently for each beam process. In some exemplary embodiments, the beam timing reference signal may be identical to a beam selection reference signal.

A UE 402 may determine the timing of a transmission based on a timing advance or adjustment to apply from the timing of the beam timing reference signal. Such timing advance or adjustment may be received from physical layer, MAC, or RRC signaling, such as a timing adjustment command. A timing adjustment may be specific to a beam process and apply to all subsequent transmissions for which a specific beam process applies. A beam process may be identified explicitly along with a timing adjustment command, or implicitly based on a beam process corresponding to a transmission to which the timing adjustment command applies.

In some exemplary embodiments, a time alignment timer may be configured for each beam process with a value possibly specific to this beam process. A time alignment timer for a beam process may be restarted every time a timing adjustment command is received for this beam process. A UE 402 may be allowed to perform a transmission according to a beam process only if the time alignment timer for this beam process is running (not expired).

Quasi-Co-Location Assumption

In some exemplary embodiments, a UE 402 receiving a downlink physical channel using a beam process may assume that the antenna port over which a reference signal associated to the beam process is transmitted is quasi-collocated for at least one long-term channel property (such as timing, delay spread, or Doppler spread) with the antenna port(s) over which the downlink physical channel is transmitted. Such reference signal may correspond to the beam selection reference signal associated to the beam process.

Channel State Information Per Beam Process

In some exemplary embodiments, a UE 402 may report channel state information on a per beam process basis. A UE 402 may perform measurements on at least one channel state information reference signal (CSI-RS) and at least one interference measurement (IM) resource. Resources for such signals may be provisioned independently for each beam process. A measurement may be performed using a current beam of a specific beam process. Physical layer signaling, such as an instance of downlink control information, may identify a beam process and possibly a current beam. Such downlink control information may contain any of the following information: a request for performing a CSI measurement, a request for a reporting measured CSI, allocation of resources for CSI-RS, or allocation of resources for interference measurement.

Beam Process Synchronization State

In some exemplary embodiments, a synchronization state may be associated to a beam process. A UE 402 may determine that a beam process is in a "synchronized" state if a synchronization timer is running and/or the latest beam selection procedure completed successfully. A synchronization timer may be restarted upon successful completion of a beam process' beam selection procedure resulting in at least one current beam. The duration of such a timer may be pre-defined or configured by higher layers or on a per-process basis. If a UE 402 detects that a beam selection procedure initiated and failed, then a UE may stop a synchronization timer.

A UE 402 may determine that a beam selection procedure was successful if a UE 402 measured a signal above a level or quality for at least one beam, or if a UE 402 received an indication from the network that the beam sounding reference signal was received successfully. A UE 402 may be allowed to perform a transmission using a beam process only if the beam process is in a "synchronized" state, or for an applicable synchronization timer is running.

Beam Process Procedures

Beam Creation Procedures

The procedures described in the following paragraphs may be used to create an initial (or primary) beam process and/or synchronize an initial beam process, create additional beam process, or delete a beam process.

A UE 402 may initially have no beam process or a default beam process not in a synchronized state. Such a situation may occur, for example, before initially accessing the system or after determining that no beam process is in a synchronized state. The creation of an initial beam process (or synchronization of a default beam process) may take place as part of initial system access.

In an exemplary embodiment, a UE 402 may initiate a random access procedure based on measurements taken on a signature sequence and/or a mobility reference signal and based on a random access configuration that may be broadcasted. A UE 402 may randomly select a signal, such as a preamble among a preamble group. In some exemplary embodiments, the preamble group may be dependent on a beamforming capability of a UE 402. The transmission of such a preamble may use a default beam, such as a very wide beam or nearly omnidirectional beam. Alternatively, the transmission of the preamble may use a beam if a UE 402 may determine one for measurements taken on available signals.

A UE 402 may attempt to receive at least one random access response and possibly retransmit the preamble at a higher power level if such reception does not occur within a time window. A UE 402 may eventually decode at least one random access response and select one such response. Each such response may contain at least configuration and resources applicable to the beam process. Such responses contain at least one of following items: resources for a beam selection reference signal; resources for a beam sounding reference signal; a timing advance adjustment; a beam process identity; and at least one parameter for power control (such as a reference transmission power). If a parameter for power control is not provided, this parameter may use a value broadcast as part of a random access configuration.

A random access response may contain other information elements used for an initial transmission over an uplink physical channel. The resources for a beam selection reference signal may occupy several symbols occurring after a time offset following the random access response. Such random access response may be pre-defined or signaled in the random access response. A UE may measure such resources to determine a best beam for reception (or current beam). In case a UE received more than one random access response, a UE 402 may measure on the more than one corresponding beam sounding reference signal resource and select which random access response to follow for subsequent transmissions based at least on the measured signal quality or level among all responses.

A UE 402 may use the current beam (for a beam selection reference signal of the selected random access response) for the transmission over the beam sounding reference signal resources. Such resources may typically occupy several symbols occurring after a time offset following the last symbol used for beam selection reference signal resource. A transmission over the beam sounding reference signal resources allows the network to determine a best beam at a transmission/reception point (TRP). In some exemplary embodiments, a UE 402 may proceed with the procedure if it receives an indication from the network following transmission of the beam sounding reference signal that reception was successful. Subsequent transmission and reception over an uplink physical channel and downlink physical channel may use the current beam determined from measurement of the beam selection reference signal. Further refinement of the current beam may subsequently be initiated by the network.

In some exemplary embodiments, a UE 402 may utilize at least one parameter provided for the beam selection reference signal and beam sounding reference signal resources for the generation of demodulation reference signals in uplink and downlink. For example, such a parameter may consist of an identity parameter used for determining a sequence.

In some exemplary embodiments, a UE 402 may receive an indication from physical (or higher) layer signaling for the creation of a new beam process. An indication itself may be received using an existing beam process. For example, such indication may consist of downlink control signaling that triggers a random access procedure. Resources for a new beam process may be provided in a subsequent random access response similar to other exemplary embodiments. Alternatively, an indication may directly allocate resources for a new beam process and directly trigger reception and transmission over beam selection and beam sounding reference signals, respectively. In such a case, the applicable timing advance may be the same as an existing beam process used to receive an indication.

In some exemplary embodiments, a UE 402 may receive an indication from physical (or higher) layer signaling for deletion of an existing beam process. A UE 402 may perform measurements for a beam process. Such measurements may enable a UE 402 to identify the best beam within the beam process. For example, a UE 402 may be configured to use a beam within a beam process configuration (a current beam.) A UE 402 may perform measurements using that beam along with a subset of other beams (possibly beams within a beam group as defined later). Such measurements may be periodic and configured by a network. In another exemplary embodiment, such measurements may be aperiodic. For example, a UE 402 may be triggered to perform such a measurement by its serving TRP, possibly via a transmission using that beam process. In another example, a UE may be triggered to perform such measurements over a beam group by a measurement performed on a beam associated with a beam process.

Upon taking such measurements, a UE 402 may determine that a new beam improves reception (and possibly transmission) from/to a TRP/cell/eNB. In such a case, a UE 402 may autonomously update a beam process to include a new beam. A UE 402 may also indicate to the network (such as via a transmission using a beam process itself) that the UE 402 has changed its beam. This may enable the network to determine if its own beam still best suits the new UE beam. In another exemplary embodiment, upon determining that a new beam may improve the performance of a beam process, a UE 402 may request the network to start a new beam selection procedure. Such a process may or may not require a UE 402 to use the newly determined beam.

Mobility Related Aspects

Upon triggering measurements on a set of beams (beams within a beam group), a UE 402 may not find a suitable beam to use within the beam process. For example, a UE 402 may begin a tuning process due to a measurement on the original beam process configuration that indicates that it cannot successfully transmit and/or receive data using the beam process. Such a conclusion may be based on a measurement being less than a threshold value. In this case, a UE 402 may be directed to find another beam to use within the beam process, before continuing to use the beam process. If a UE 402 fails to obtain another beam within the beam group, it may do at least one of the following actions: continue searching for a beam in another beam group or possibly in the same beam class; continue searching for a beam in another beam class or a beam class that overlaps the previously selected beam; or declare a radio link failure (RLF) or beam link failure (BLF) for the beam process. Anywhere RLF is used in this specification, it also includes a BLF.

If a UE 402 determines RLF for the beam process, it may indicate such a situation to at least one serving TRP. If a UE 402 is still configured with operational (such as non-RLF) beam processes, the UE 402 may indicate to the TRP the identity of the beam process that suffered RLF. In one embodiment, a UE 402 may transmit an uplink beam recovery transmission to carry the indication. Moreover, in a beam recovery transmission, a UE 402 may request a switch to a target beam process, e.g., an operational (e.g., non-RLF) beam process to maintain the UE radio link. A UE 402 may use pre-configured time/frequency/code/beam resources for the beam recovery transmission. For example, a UE 402 may use an uplink transmit beam associated with an operational (e.g., non-RLF) beam process. In another example, a UE 402 may transmit a beam recovery transmission on a default UL beam. A beam recovery transmission may be repeated over multiple symbols, slots, or transmissions to enable beam sweeping at a receiver. In another example, a UE 402 may transmit a beam recovery transmission in a manner of uplink beam sweeping using uplink beams associated with all configured beam processes. The UE 402 may monitor and receive a switch command in downlink L1 control signaling. The switch command may be received by the UE 402 on a default beam pair link (e.g., a widebeam, Tx and Rx beam pair that may also be omni-directional). The switch command may indicate resources on which a UE 402 may perform beam acquisition. In another embodiment, a switch command may indicate explicitly to a UE 402 one or multiple BPLs to use for upcoming transmissions. In another embodiment, a UE 402 may monitor and receive a switch command in downlink L1 control signaling for a downlink beam associated with the switch target beam process.

If a UE no longer has any operational beam processes (for example, if a UE was configured with a single beam process and that beam process suffered an RLF), a UE may perform a new initial beam process acquisition. In another exemplary embodiment, a UE may be configured with a master or primary beam process. Declaration of RLF on such a beam process may trigger a UE to perform a new initial beam process acquisition. Such a process may remove all existing beam processes. During such a process, a UE 402 may indicate to the network whether an RLF occurred on one (such as a master or primary) beam process or on all beam processes (such as on all beam processes tied to that TRP/cell/eNB).

In one exemplary embodiment, an initial beam process acquisition may use a random access procedure. In such a case, a UE 402 may be pre-configured with resources and/or preamble values to perform non-contention based RA for a beam process (re)acquisition. In another example, a UE may have connectivity to a second TRP/cell/eNB. The second TRP/cell/eNB may provide a UE, possibly upon declaring an RLF on one or all beam processes of a first TRP/cell/eNB, with random access resources (or preamble) to perform a non-contention based random access.

A UE 402 may maintain measurements on at least one mobility reference signal (MRS). Such mobility reference signals may be transmitted per TRP, or on orthogonal resources for each TRP. Mobility measurements may use a specific beam process (such as a beam process dedicated for such measurements). A UE 402 may determine to add a new beam process. Such a determination may be triggered by: a measurement on at least one MRS indicating the possibility of obtaining one or more new beam processes; a determination by a UE 402 to improve reception or transmission performance; location of a UE; or an RLF on one or more beam processes associated with a TRP/cell/eNB. A UE 402 may improve reception or transmission performance via increased diversity that comes with the addition of a new beam process. In another exemplary embodiment, a UE 402 may request that a new beam process enable CoMP-like transmission and reception. Regarding location, a UE 402 may store its location with respect to different TRPs and may determine that one or more new beam processes may be called for from a new TRP. Upon determining to add a new beam process, a UE 402 may indicate to the network measurements taken or an explicit indication to add one or more new beam processes (or to replace an existing beam process with a new beam process). This indication may initiate a new procedure for beam process acquisition.

If a UE 402 is able to add a new beam process without removing another one (such as if an unused TRX chain remains), a UE 402 may indicate that a new beam process may be added to the list of existing beam processes. Alternatively, the network may be informed of a UE's beam process capability and may begin adding a beam process without removing a previous one.

In another exemplary embodiment, a UE 402 may indicate to the network its inability to add a new beam process without either removing an existing one or at least modifying the parameters of an existing one. Furthermore, a UE 402 may indicate to an existing beam process a request to add a new beam process. For example, a UE 402 may indicate that an existing beam process be configured for a subset of time resources. A UE 402 may indicate the set of beam process(es) to use for such a time resource restriction.

A UE 402 may indicate, possibly to a new TRP/cell/eNB, which time resources to configure for a new beam process. The new beam process may be configured for an orthogonal set of time resources. This configuration change may enable co-existence of the new beam process with previously configured beam processes.

A UE 402 may maintain sets of beam processes. The elements of such sets may include beam processes that may be used simultaneously. Such sets may include fewer elements than the maximum number of TRX chains of either a UE 402 or the TRP/cell/eNB. A beam process may be included in more than one set. For example, a UE 402 may have a first beam process with no time restrictions, a second beam process applicable to a first set of time resources, and a third beam process applicable to a second set of time resources orthogonal to the first set of time resources. In such a case, a UE 402 may maintain a first set of beam processes with the first and second beam processes, and a second set of beam processes with the first and third beam processes. Time restrictions for a previously configured beam process and a new beam process may remain in place until further re-configured by the network or until a UE 402 requests a change of parameters on one or more beam processes.

In an exemplary embodiment, upon triggering a mobility event, a UE 402 may assume that one beam process (or all beam processes) may use a pre-configured set of time resources. One beam process may be a master beam process, or time resources may be determined based on the beam process ID. A UE may perform beam process acquisition on time resources orthogonal to time resources used for a pre-existing beam process. Upon completing the mobility event, a UE 402 may assume a new beam process to be valid for all time resources, and a previously configured beam process restricted during the mobility event may be completely removed.

A UE 402 may use different beam process acquisition methods dependent on the cause for the addition of a beam process. For example, if the cause is to increase the number of beam processes, such as to increase diversity or multiplexing, a UE 402 may attempt to obtain a new beam process based on rules tied to the existing beam processes. In this example, a UE 402 may test a restricted set of beams (or beam groups or beam classes) to obtain a new beam process. The restriction may ensure addition of a new beam process to a set of existing beam processes, and the new beam process is not likely to be correlated with an existing beam process.

In another example, if a UE 402 requests to add a new beam, for example due to RLF, a UE 402 may begin the process with a specific beam group and/or class. This methodology may ensure finding a new beam process in a shorter period of time, regardless of whether the new beam process optimizes transmission/reception performance. For example, a UE 402 suffering an RLF using a beam of a specific beam class may attempt a new beam process acquisition using higher or lower class beams.

A UE 402 may indicate to the network a request to add a beam process. Such an indication may include: a cause for adding a beam process; existing beam processes to be replaced with new beam processes; or a beam process use restriction. For example, use restrictions may include a communications link direction (such as UL, DL, SL, or a combination). In another example, use restrictions may include transmission type (for example, mMTC, URLLC, eMBB). In yet another example, use restrictions may include beam process parameters (for example, SOM or numerology). In a further example, use restrictions may include the purpose of the beam process (for example, for data transmission or for mobility measurements). In another example, a use restriction may list subsets of time resources expected to be used by a beam process.

A UE 402 may request to add or remove a beam process. Such a request may be done using dedicated resources to a serving TRP/cell/eNB. For example, a UE may transmit a request for removal of a beam process using the beam process itself. In another example, a UE may request to add a beam process to a TRP, indicating a TRP ID (or any parameter obtained on an MRS) to a source TRP.

In an exemplary embodiment, a UE 402 may request to add a new beam process by using an RA-like procedure. A UE 402 may transmit a random access preamble using a beam to be used for a new beam process. This transmission may trigger an operation where only the TRP/cell/eNB beam is matched to a UE's beam for the beam process. In another example, a UE 402 may use a beam from a specified RA appropriate beam class. The ensuing procedure may force an optimization of both a UE's beam and a TRP/cell/eNB beam.

In another exemplary embodiment, a UE 402 may have a dedicated beam and/or beam process to transmit requests for beam additions (for example, using an RA). Such dedicated beams and/or beam processes may be configured by the network. In another example, a UE 402 may be configured with one or more beam processes for specific uses. Furthermore, one or more such beam processes may be tagged to be used for additional beam process requests.

In some embodiments, the UE 402 receives beam process transmission multiplexing configuration for simultaneous beam processes.

In some embodiments, the UE 402 may be configured to transmit simultaneously to different TRPs when associated beam processes may have identical signal configuration including sub-carrier spacing, symbol length, resource block size, cyclic prefix length, etc. In such embodiments, the uplink beam transmissions to different TRP may use the same frequency resource and spatially multiplexed, with the uplink beams being directed to the TRPs in such a way that the isolation between the beam patterns may be higher than a pre-configured threshold. A potential benefit of this approach may be reuse of the frequency resource and the resulting high uplink spectrum efficiency.

In another embodiment, the uplink beam transmission may be multiplexed using dedicated frequency resource for each beam process associated with different TRPs. The resulting uplink beam patterns may overlap partially, and reduced beamforming complexity may result.

Alternatively the UE 402 may use different orthogonal spreading codes for the beam process associated with different TRPs and the code configuration may be received for each TRP.

Beam Selection Procedures

The following sections describe methods and exemplary embodiments for beam selection. While the exemplary embodiments may be described from the perspective of a single beam or a single beam-process, it should be understood that in practice the procedure may be applied to multiple beams processes in parallel.

Beam Classes

A beam may be generally characterized as described in Section 7.1.1 of 3GPP specification TR37.842, Radio Frequency Requirement Background for Active Antenna System Base Station, Release 13, v.1.8.0, October 2015. As described earlier, FIGS. 3A and 3B illustrate the difference between beam peak direction and beam center direction. A beam peak direction refers to the maximum point for a beam, while a beam center direction refers to the center point of the beam's distribution.

Figure 5:
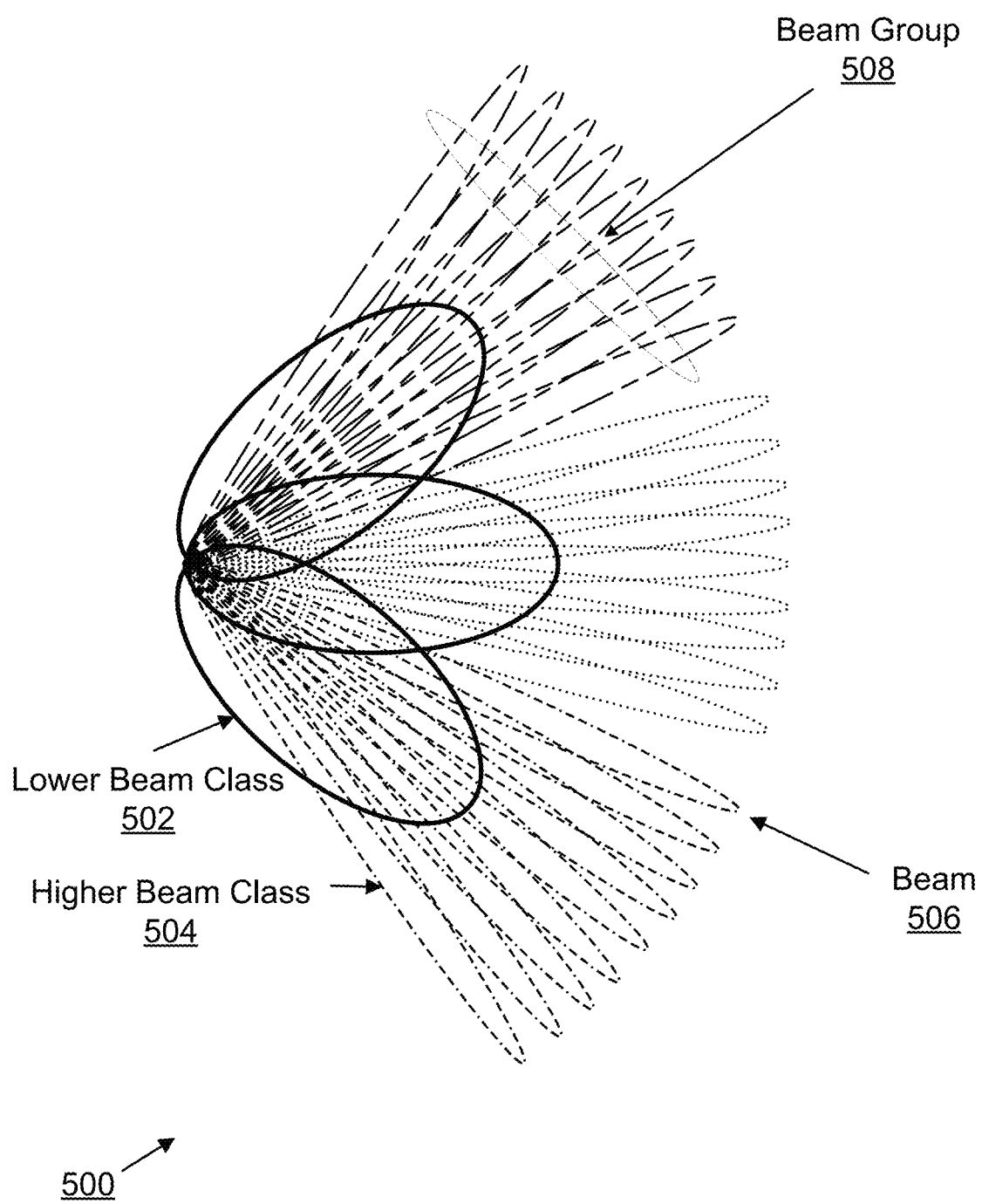
FIG. 5 depicts a beam transmission pattern to illustrate beam groups and beam classes.

FIG. 5 illustrates the differences between a beam 506, beam group 508, and beam class 502, 504. It also shows the difference between a lower beam class 502 and a higher beam class 504. A beam family in this example may consist of all the beams of the same class.

Exemplary Embodiments to Maintain the Link Across Beam Classes

Different beam classes may exhibit different coverage levels. Typically, the more directional the beam, the better the coverage in a specific direction. This observation also means that there often exists a tradeoff between directionality and coverage. Wider beams may exhibit less coverage, which may be problematic to some types of traffic or control channels. When changing to a lower beam class, a UE may lose the radio link. Similarly, when a UE changes to a higher beam class, a UE may end up transmitting too much power for a given rate.

In an exemplary embodiment, a UE may be configured to scale its transmit power according to the beam class. For example, a lower beam class may use more power (such as for a given bit rate, transport format, or MCS) compared to other higher beam classes. This configuration may be implemented, for example, using a pre-defined power scaling factor associated with a beam class. While this approach may lead to similar receive power at the eNB and may maintain the radio link, it also limits the data rate per beam class as the power amplifiers are typically power-limited.

In an exemplary embodiment, the link may be maintained by using repetition over multiple beams. For example, a UE may be configured to repeat transmission of a given data block over multiple beams (for example, belonging to the same beam group) over multiple time instances. A UE may be configured to use a pre-defined sequence of beams (for example, within a beam group).

Repetition over multiple beams may be triggered, for example, when a UE changes to a lower beam class. In one exemplary embodiment, this approach avoids segmentation due to a change in coverage, which resulting from a change to a lower beam class and is applied only to HARQ retransmissions.

In one exemplary embodiment, repetition over multiple beams may be triggered and controlled by the network. For example, a UE may receive an indication on a control channel (for example, DCI) to initiate repetition over multiple beams. Optionally, an indication may include a beam class and/or beam group index to use for transmitting data. This indication, for example, may be accompanied by an indication to change to a lower beam class.

In another exemplary embodiment, a UE may be configured to indicate to the network (for example, UCI) when repetition over multiple beams is called for (for example, when a UE has data in its retransmission buffer to retransmit over multiple beams).

For yet another exemplary embodiment, a UE may transmit over a subset of beams at a time. More specifically, a UE may be configured to transmit repeated data over a subset of multiple beams within a single TTI. A UE may receive an ACK/NACK from the network and continue to transmit repetition data over another subset of multiple beams. A UE repeat this process until it receives an ACK from the network or until it has transmitted over all relevant beams.

Determining the Set of Available Beams for Selection

A UE may be configured to select a beam for transmission over a subset of its beams (also referred to as a set of available beams). A subset of beams may be configured by the network (for example, semi-statically (such as over RRC) or dynamically (such as via a DCI-type of signaling).

In an exemplary embodiment, a UE may be configured to determine a set of available beams based on a beam class. For example, a UE may determine that a set of available beams corresponds to a beam group, for example, associated to a beam of a lower beam class linked to a beam process. In another option, a UE may determine a beam group based on, for example, the direction of arrival for a downlink reference signal associated with the beam process. For instance, the set of available beams may be a beam group of a lower beam class with the closest beam direction as the downlink reference signal's direction of arrival (DoA).

In an exemplary embodiment, a UE may be configured with a set of available beams constrained by angular limits. For example, these limits may be applicable to a beam's direction. A UE may be configured to limit a beam's direction for a set of available beams to a specific angular distance from the DoA for a downlink reference signal associated with a beam process.

In another example, a UE may be configured to use an arbitrary beam constrained to lie within a certain beam space. The beam space may use angular limits to set its boundaries. For example, a UE may determine that a set of available beams consists of any beam for which its beam direction is within a set of values (for example, associated with a DoA of an associated beam process' downlink reference signal). A UE may further apply one or more conditions due to a beam having arbitrary shapes. In one exemplary embodiment, a UE may limit a beam's specific amount of energy (for example, 90%) to specific angular limits. For example, the angular limits may be determined based on an angular difference value configured by the network ($\Delta DoA$) that is applied to the DoA of the downlink reference signal associated with the beam process.

A UE may be configured to determine which beam class to use for its uplink transmission. The network may configure a UE to use a specific beam class, such as via a DCI or via semi-static signaling (such as RRC). In another exemplary embodiment, a UE may be configured to determine in isolation the most appropriate beam class based on factors saved by a UE.

A UE may determine a beam class to use for transmission, based on transmission data. For example, a UE may be configured to use one or more beam classes for control information (such as RRC signaling or RACH accesses) and one or more beam classes for data transfer. In another example, a UE may be configured to use a beam class for each logical channel. A UE may use a beam class associated with a logical channel being transmitted. A UE may also store rules to determine which beam class to use when multiple logical channels with different associated beam classes are multiplexed together. For example, a rule may use the lowest beam class of the beam classes associated with the logical channels multiplexed in that transport block.

In another example, a UE may be configured to use specific beam classes for different traffic types, such as mMTC, eMBB URLLC, or QoS. For example, a UE may be configured with a beam class directly in a QoS configuration, or a UE may be configured with an association table or filter that links a QoS to a specific beam class.

A UE may be configured to indicate to the network which beam classes a UE uses in its UL transmission. This information may be carried in the UCI, or in a special MAC header or other type of signaling. A UE may indicate to the network only when it changes beam classes or when a UE makes a decision of which beam class to use.

In another exemplary embodiment, a UE may be configured explicitly from the eNB to use a specific beam class. For example, the eNB UL grant may indicate a specific beam class to use for uplink beamforming. For such a case, the beam class may be valid only for a grant's duration. Alternatively, a UE may be configured semi-statically with a beam class to use.

A UE and the network may maintain synchronization of the beam class state so that both UE and the network remain constantly aware of which beam class is being used. A number of approaches may achieve this synchronization. For one approach, the opposite entity acknowledges all beam class changes (for example, at the MAC or RRC protocol level). In an example of this approach, a UE may indicate a beam class change via a special MAC control element and only apply the change when it receives a reliable acknowledgement from the network (for example, from a DL MAC control element).

A UE may keep a beam class configuration until it changes the configuration or until a UE receives a message from the network to change it. A UE may be configured to either change beam classes immediately and acknowledge the network message in its next transmission (e.g., in a MAC header or other control message), or a UE may apply the change only after acknowledging a network's message and receiving an acknowledgement (for example, a HARQ-ACK or other higher layer acknowledgement) from the network.

A UE in practice may be configured with multiple beam processes. While the network may control the direction of transmission for the associated downlink reference signals, each beam process should lead to independent propagation paths, in order to exploit the spatial diversity or spatial multiplexing capabilities of the channel. A UE will avoid transmitting data over the same propagation paths (and thus beams) for different beam processes. When determining a set of available beams, a UE may be configured to exclude one or more beams related to other on-going or active beam processes.

A UE may be configured to determine the set of beams related to a given beam process. A UE may create a list that includes: the same beam as the selected beam in the (other) beam process; the beams in a beam group associated to a beam process; the beams within a range of beam indices for a selected beam of the (other) beam process; and the beams within an angular distance of a selected beam of the (other) beam process. The beams in a beam group associated with a beam process includes a beam group of a lower beam class associated with a selected beam of a beam process. The range of beam indices may be configured a priori by the network or via a specification. For example, a range of beams may include all beams within ±N beam indices from a selected beam.

The angular distance may be configured a priori by the network. The related beams comprise the beams (for the same beam class) for which the beam center lies within a specific maximum angular distance from the beam center of the selected beam for the (other) beam process. The maximum angular distance (for example, in degrees or radians) may be configured by the network. For example, related beams may be defined as any beams where the beam center lies within ±Δmax of a beam center of the (other) beam process. Alternatively, a set of related beams may be defined based on both a beam's 3 dB (or other value) lobe and the beam center of a selected beam of the (other) beam process. Any beams for which the 3 dB lobe falls within ±Δmax of the beam center of the (other) beam process selected beam may be considered related.

When configured with more than one beam process, a UE may be configured for each beam process to select a beam outside the set of related beams (consider all outside beam processes). A UE may be configured to select the best available (and unrelated) beam.

In an exemplary embodiment, when a UE determines that the best beam to select falls within a set of related beams and/or when a UE determines that the set of available beams is empty, a UE may be configured to stop transmission on the associated beam process or a UE may notify the network (for example, via control signaling) by transmitting on a different beam process which has an available beam. A UE may further indicate the beam process number or identity and the related beam or beam process.

Selection Procedures

A UE may determine a beam class, a beam group, and a beam to use for uplink transmission based on measurement of one or multiple downlink beams by using at least one of the following exemplary embodiments: quality/spatial/energy metrics, periodicity, downlink control/data/reference signal transmissions, single-stage measurements, or multi-stage measurements.

Beam quality metric measurements may be based on SNR, Eb/No, RSSQ and CQI. Beam spatial information measurements may be based on angle of arrival (AoA). Beam energy metric measurements may be based on RSSI and wide-band AGC settings.

Beam periodicity measurements may be periodic or aperiodic, where the beam measurement may be scheduled by the network. During active downlink data transmission, a measurement field or gap may be included in the measurement scheduling. A beam measurement may be configured in system broadcast information or higher layer dedicated signaling including measurement periodicity. A UE may be triggered for periodic measurements within a pre-defined period.

For downlink control/data/reference signal transmissions, the beam measurement may be performed on the downlink beam associated with downlink control information, downlink data transmission, scheduled downlink reference signal transmission (for example, a beam selection reference signal), or periodical downlink reference signal transmission (e.g. a beam selection reference signal).

Single-stage beam measurements may be measured using: one or multiple beams from a beam group of one beam class pre-configured and selected by a UE for beam measurement, a beam class based on target measurement beam class and uplink transmission service type for which the measurement is to be used, or a sweep of applied beams in a consecutive or arbitrary manner to cover a beam space within which the target downlink beam may be received.

Multi-stage measurements may be measured using: one or multiple beams from a beam group of a first beam class to obtain a first measurement result selected in a manner similar to single-stage measurements; a continuation of the first measurement process to use a next measurement, and based on the first measurement result, use one or multiple beams of a second beam class, which may have one or multiple different characteristics compared to the first beam class (such as decreased beam width or adjusted center direction); or a multi-stage sweep, where each stage may consist of selected beams and may reduce beam space gradually with a UE determining spatial information and quality metrics of measured downlink beams.

Based on a measurement result, a UE may select at least one beam from a beam group of a beam class for uplink transmission using: a linkage between beam class used for the measurement and its associated beam class for uplink transmission, a calculation based on directional reciprocity, or a sweep of multiple selected uplink beams over a beam space based on the measurement.

A linkage of beam class for measurement and for transmission may be included in a beam process. In some exemplary embodiments, a UE may select an uplink beam of the same beam class as the ones used for measurement. For example, a selected uplink beam may have a similar beam width, beam center direction, or beam space.

A directional reciprocity calculation may be between, for example, AoA and AoD. In an exemplary embodiment, a UE may select an uplink beam from a beam class with a beam center direction calculation based on estimated AoA information of a downlink measurement and on beam width.

For a sweep of multiple selected uplink beams, a UE may select a group of beams of a different beam class than one used for measurement and sweep of beams over the measured downlink beam space.

A UE may set a beam-specific power for a selected beam based on a measurement and other configurations including: expected power offset associated with measured beam class signaled by the network, uplink channel type and service intended for an uplink transmission, priority and the maximum limit of a selected beam class, maximum transmit power of each antenna element, maximum EIRP of a UE uplink transmission, and an EIRP adjustment indication from the network which a UE may use to adjust the beam class or to maintain a beam class while adjusting the power per element.

A UE may determine one or more of a beam class, a beam group, and a beam to use for uplink transmission based on feedback received for uplink beam sounding procedures. The sounding procedures may be scheduled and configured by the network. The configuration may include: an antenna port configuration, a beam class indicator, the number of sounding beams, a time resource allocation, frequency resource allocation, a reference signal configuration of sounding beams, and an EIRP of a sounding beam. An antenna port configuration indicates which ports to use. A beam class indicator indicates which beam class may be used for sounding per antenna port. The number of sounding beams indicates how many sounding beams to transmit per antenna port. An exemplary embodiment for a time resource allocation may allocate a field of multiple symbols in a control field of one sub-frame or a gap of multiple symbols in a data section of one sub-frame. In another exemplary embodiment, a special sub-frame may be configured for a sounding procedure. An example frequency resource allocation may be a group of subcarriers or resource blocks. An example reference signal configuration of sounding beams may be a base Zadoff-Chu (ZC) sequence for each antenna port or for a UE. An EIRP of a sounding beam may include a beamforming gain and a power for each antenna element.

A UE may select arbitrarily sounding beams according to the configured number of sounding beams from a beam group for an indicated beam class. For each sounding beam transmitted from the same antenna port, a UE may apply the same ZC base sequence. The ZC base sequence may be configured per antenna port. The sounding beams per antenna port may be transmitted one at a time. Different antenna ports may have sounding beams using different ZC base sequences to maintain orthogonality.

In another exemplary embodiment, a ZC base sequence may be configured per UE, where each antenna port may be assigned by a cyclic shift by a UE based on a downlink beam measurement. For such a case, sounding beam reference signals may be orthogonal between a UE's antenna ports.

An uplink beam sounding may be triggered by pre-configuration events, such as a UE entering fallback or a downlink data beam's quality falling below a pre-configuration threshold.

A UE may perform a multi-stage uplink beam sounding procedure for several scenarios as described in the following exemplary embodiments. For one exemplary embodiment, a UE may be configured with a multi-stage sounding procedure request with a sequence of beam classes to use for each stage of the sounding procedure. The configuration may include time resource and reference signal configuration for each beam class. In another exemplary embodiment, a UE may autonomously decide a sequence of beam classes and use a pre-defined set of reference signal sequences reserved for an autonomous uplink beam sounding so thatthe network may detect sounding beams. A UE may receive network feedback in the control information received in the downlink beam. Such feedback control information may have a fixed timing relationship with a sounding beam transmit timing, and a UE may monitor feedback based on a timing relationship. In another exemplary embodiment, feedback may be included in scheduled downlink data. The feedback content may be a bitmap to indicate which sounding beam may be received above a threshold and may be used on for further sounding. Feedback may also include sounding beam metric information and a reference signal index of those sounding beams. A UE may decide which beam class to use based on received feedback. In an exemplary embodiment, a UE may use a beam class according to a configured beam class sequence. A UE transmits the next set of sounding beams in the beam space of the previous sounding beams whose feedback is above a threshold. The network may configure a new resource allocation for each stage or alternatively apply the same resource until the multi-stage sounding procedure completes.

A UE may select an uplink beam based on the best sounding beam indicated in the feedback of an uplink beam sounding procedure. In another exemplary embodiment, the network may schedule one or multiple beams of a beam class according to an uplink beam sounding. A UE may receive an uplink beam and beam class configuration in downlink control information.

The network may schedule beams of different beam classes for each antenna port depending on the uplink and service type of the uplink transmission. For example, the network may schedule a beam class for uplink control information transmission at one antenna port and another beam class for data transmission at another antenna port. Scheduling may be done using one or multiple fields in a DCI to indicate a beam and a beam class.

Transmit beams may be multiplexed in time and frequency domains. For example, in one sub-frame, a UE may use a beam class in an uplink control field and a different beam class in an uplink data field. In another exemplary embodiment, a UE may transmit simultaneous beams of different beam classes, where each beam may apply a different group of subcarriers or resource blocks.

The power of each beam class may be determined based on feedback of an uplink beam sounding procedure. Each beam class may have independent maximum EIRP and maximum transmit power per antenna element. Power control per beam may be limited by the maximum EIRP of beam class.

For a specific uplink channel transmission, the network may configure a power control command specific to a beam class. A UE may adjust transmit power per element. In another exemplary embodiment, the network may configure different beam classes for uplink transmissions, and a UE may adjust transmit power per element in accordance to a new beam class. For example, a reconfigured beam class may have a wider beam width, and a UE may increase transmit power to maintain a total EIRP.

The network may schedule uplink beam and beam class to maximize uplink transmission capacity and to avoid uplink transmission interference between co-scheduled UEs. In maximizing uplink transmission capacity, the network may use an uplink beam based on the beam class with the best sounding results with a very narrow beam width. The procedure may increase spectral efficiency for a single user. In avoiding uplink transmission interference, the network may evaluate, for example, uplink beam sounding results from all UEs that may transmit to the same TRP and select a beam and beam class for each UE so that the transmit beam of one UE may have a null toward the main lobe direction of the transmit beam of the co-scheduled UE. This technique may enable co-scheduled UEs to use the same time, frequency, and code resources and increase the average spectral efficiency per TRP.

A UE may trigger an uplink fall-back procedure under multiple scenarios, such as when receiving ramp-up TPC bits and reaching the maximum EIRP of the beam class while receiving downlink NACK of the data beam transmission, when receiving a pre-defined number of NACK messages for a specific uplink beam used for data transmissions, or when entering a beam misaligned state based on pre-configuration criteria.

A UE fall-back procedure may include the following actions: discontinuing use of the currently selected beam and beam class, selecting another beam class to continue uplink data transmissions, setting transmit power per element in accordance with a selected beam class, and starting an uplink sounding procedure using pre-defined resources.

When selecting another beam class to continue uplink data transmissions, a new beam class may be the lowest beam class or a beam class with a pre-defined offset lower than the used beam class. Also, for example, a new beam class may have a wider beam width or a different beam center direction.

When setting transmit power per element in accordance with a selected beam class, a UE, for example, may increase transmit power to compensate for a reduced beamforming gain when using a lower beam class. When maximum power per element is reached, a UE may apply beam sweeping to provide accumulation gain.

Starting an uplink beam sounding procedure using pre-defined resources may include reserving reference signal sequences for a fall-back trigger of uplink beam sounding and allocating pre-configured time and frequency resources for a fall-back trigger of uplink beam sounding. For example, there may be symbol and subframe locations calculated based on UE and TRP identities that may be used for the sounding.

In another exemplary embodiment, a UE may send a fall-back indicator to the network using an uplink beam of a different beam class (such as a beam used for uplink control information transmission from another antenna port). An uplink beam for control transmissions may experience uncorrelated blockage or channel events and may be used. A UE may receive an uplink sounding beam request and configuration to start uplink sounding. The resource configuration may not be reserved and may be dynamically configured. In another exemplary embodiment, a UE may receive an initial beam process request.

Maximum Power Reduction (MPR) Due to SAR

A UE may receive from the motion sensors the human body monitoring information including the detected distance and the angular direction. The UE may collate the human body detection data to determine which uplink beams may locate in a pre-defined proximity of the detected human body. The UE may autonomously apply a Maximum Power Reduction (MPR), e.g., of a pre-defined value to each identified uplink beam. Note the maximum power may denote the total Effective Isotropic Radiation Power (EIRP) emitted by the uplink beam pattern.

The UE may perform the maximum power reduction using one or more of a variety of different techniques. In one technique, the UE backs off the maximum transmit power per element of all antenna elements associated with the identified uplink beam. In another technique, the number of antenna elements used for the identified uplink beam is reduced. Note that this may be implemented in a UE having the capability of scaling the number of antenna elements used for the analogue beamforming. Also the reduction of antenna elements may cause the change in the beam class. In another technique, the UE may switch to a different antenna set (if it has such capabilities; this may be the case in above 6 GHz bands) which may be located on the opposite side in order to keep the radiation pattern at an optimum power.

The UE may autonomously determine how to reduce the total EIRP. In some embodiments, the network may pre-configure the UE with antenna element scaling capability with information regarding how MPR may be performed.

The UE may be configured with an indication of which method should be applied for reduction of maximum EIRP, e.g. whether reduction should be applied by reducing maximum power or reducing the number of antenna elements. Such configuration may be provided by higher layer signaling.

Beam Process Parameter Update

The UE may further identify which active beam process may associate with the uplink beams with SAR-caused MPR and update the related parameters of the identified beam process. The beam process specific parameters may include the updated maximum total EIRP, maximum configured power, resulting power headroom and beam class. The beam class change may cause the UE to update the estimate of interference received at the TRP within the uplink beam.

PHR Triggered by SAR-Caused MPR

For each identified beam process the UE may be triggered to send a report, such as a power headroom report (PHR) or EIRP report that indicate new parameters applicable to the adjusted maximum power at least for the beam process for which the maximum EIRP and/or Pcmax has changed. In the report, the UE may specify the MPR cause to be SAR-related and the identities of affected beam process. The report may be transmitted as control information at the physical layer. In the latter case, the control information may be associated with the same or a different beam process. A potential benefit of using UCI transmission may be low latency and overhead as the SAR-caused MPR may become more frequent in the beamformed operation of HF NR. In another embodiment, the UE may transmit the report using MAC or RRC signaling.

Maximum Gain Offset Report Triggered by SAR-Caused MPR

The UE may be configured or autonomously apply a MPR by reducing the number of antenna elements and thereby decrease the beamforming gain of the beam process. The UE may keep the per element power unchanged. The UE may be triggered to report a maximum gain offset report to indicate the offset between the applied beamforming gain and the configured maximum gain of the beam process. The eNB may trigger an uplink beam re-selection for the beam process. In another solution the eNB may reduce the transport format such as coding rate and modulation scheme for the beam process with reduced beamforming gain in order to maintain the radio link. This may improve the robustness of the beam process during the MPR.

Beam Process Re-Selection Triggered by SAR

The UE may re-select the active beam processes that may have updated parameters and PHR as a result of the SAR-caused MPR. The uplink beam re-selection may be done in accordance with a set of pre-configured rules. The UE may apply the rules in accordance with the beam process uplink transmission type, the updated uplink transmission, uplink channel type and uplink transmission mode and scheme. In some exemplary embodiments, the UE may change the beam process association by establishing a new beam process or switching to another active beam process with a new set of downlink and uplink beams.

Uplink Beam Re-Selection of the Active Beam Process Affected by SAR

Figure 6:
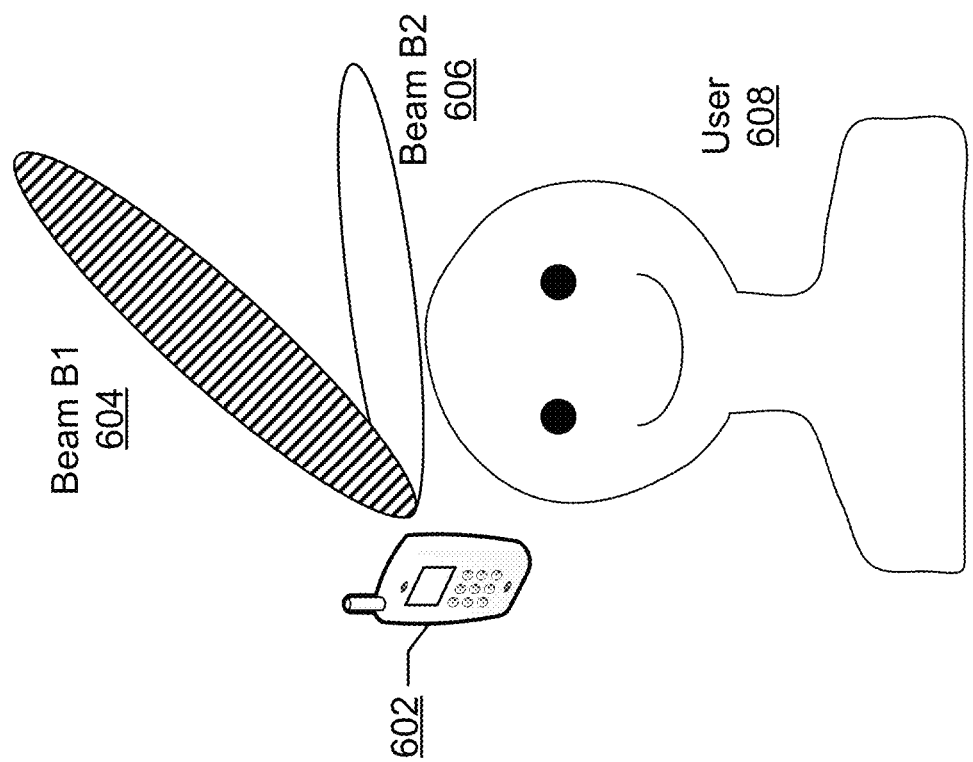
FIG. 6 is a schematic diagram illustrating one embodiment of uplink beam re-selection of an active beam process affected by SAR.

The UE 602 may re-select the uplink beam of the active beam processed as a result of the MPR cause by SAR. As shown in the exemplary embodiment 600 illustrated in FIG. 6, the UE 602 may reselect beam B1 (604) to replace beam B2 (606) for the active beam process due to the proximity of beam B2 (606) to a human body 608. The UE 602 may take into consideration the reduced maximum EIRP and MRP in the open loop selection of the uplink beam. For example, the UE 602 may apply a negative EIRP reduction to an uplink beam that may correspond to the active downlink beam associated with the beam process in a reciprocal way. As a result, the UE 602 may not select the uplink beam reciprocal to the active downlink beam associated with the beam process. The UE 602 may select another uplink beam not based on reciprocity but based on adjusted maximum EIRP of available uplink beams including those affected by SAR. The UE 602 may also fall back to a default uplink beam pre-selected and maintained for the beam process The UE 602 may re-estimate the path loss of the re-selected uplink beam. The "paired" downlink beam of each beam process may be a downlink data beam, or a reference beam, or other types of downlink beams. The pairing may not be one-to-one mapping, and the path loss estimate may use the transmit power specified in the system broadcast information. The uplink power of the re-selected uplink beam may be based on the re-estimated path loss. In another solution, the uplink power may be implicitly indicated using the periodical sync signal sequence.

The UE 602 may re-establish the transmit timing of the re-selected uplink beam. Additionally, the beam re-selection may trigger an uplink beam sweeping using the updated power and the UE 602 may initiate an uplink beam pairing and beam re-acquisition procedures. The beam re-acquisition may not be based on the associated downlink beam using reciprocity. The UE 602 may update the re-paired downlink and uplink beams for the associated beam process. The UE 602 may send the beam process update information to the eNB using the re-selected uplink beam transmission.

Beam Process Procedures Triggered by Rotation or Blockage Sensing Data: Uplink Beam Re-Selection and Re-Pairing The UE 602 may periodically estimate the antenna array's orientation change and update the local coordinate system that may be the reference for the beam direction. The UE 602 estimation may be based on the rotation and blockage sensing data provided by the motion sensors.

The UE 602 may autonomously fall back the one or multiple transmission properties including transmission mode, transmission scheme, beamforming properties, etc. For example, the UE 602 may apply a pre-configured wide or omni-directional beamwidth. The increased beamwidth may allow part of the uplink transmission energy to reach the eNB around the detected blockage through diffraction. Also the wide beam pattern may reduce the impact of the UE 602 rotation. The UE 602 may in addition use a pre-configured uplink control and data channel transport format including block size and modulation and coding scheme (MCS). Due to the widening of the beamwidth, the total EIRP may be reduced and the UE 602 may use smaller block size and conservative MCS to maintain the uplink quality.

In another embodiment, the UE 602 may initiate an uplink sounding transmission using uplink beam sweeping using a pre-defined uplink sounding configuration. The configuration may include the reference signal type and resource allocation. This may allow the UE 602 to identify uplink beams that may not be affected by the rotation or the detected blockage. The UE 602 may re-select an uplink beam based on the result of the initiated uplink sounding procedure. The UE 602 may transmit measurement or uplink beam re-pairing request following the sounding procedure.

A UE 602 with multiple simultaneous active beam processes may upon detection of rotation and blockage initiate uplink beam re-selection and re-pairing on a per-beam-process basis. The UE 602 may apply orthogonal uplink resource configuration for the uplink fall-back and re-pairing transmission either in frequency or time domain. In another solution, the UE 602 may have two spatially isolated simultaneous beam process, and in this case the UE 602 may use same frequency and time resource for the beam process transmissions.

Downlink RLF Avoidance

The blockage can be the cause of UE downlink RLF, and the UE 602 may use the rotation vector and rate estimate to predict the condition. The UE 602 may apply rules or criteria to determine whether the rotational movement or the detected blockage will cause a RFL in a near time frame. The rule may include the rate of the SINR degradation, received energy decrease and BLER increase. The UE 602 may transmit a pre-configured sequence to trigger a downlink beam re-selection procedure using control channel with pre-defined transport format. In another solution the UE 602 may apply autonomous transmission OFF based on sensing data in which case the UE 602 may switch off all uplink transmit beams and suspend an active beam process. This will prevent a UE 602 from wasting energy to operate in very unfavorable channel conditions for example with very fast rotational motion, very high speed or large blockage moving very quickly toward the UE 602. Beamformed transmissions may not be viable in these conditions.

Downlink Beam Probing and Adjustment

The UE 602 may request beam-specific reference signal transmission for downlink beam adjustment. The UE 602 may monitor a quality metric of the downlink beam associated with an active beam process during an active data reception. The quality metric may include energy detection within the active beam pair over the assigned frequency resource, DMRS symbol energy over noise, sensed rotation magnitude. The UE 602 may send a request for a BSRS transmission when the monitored quality metric exceeds a predefined threshold. The beam-specific reference signal resource configuration can be pre-configured and the UE 602 may use a receive beam sweeping to start a new beam pairing based on the detected BRS. The UE 602 may decide and update the receive beam associated with the active beam processes.

The UE 602 may probe the receive beams periodically or triggered by pre-defined events for each active beam process. The UE 602 may perform a receive beamforming probing per TTI or a number of TTI averaged over a predefined time period during an active downlink data transmission. The UE may use CP or GP attached to each symbol or a field specific to the sub-frame structure, in which useful data transmission is not present, especially for single-receive-beam UE. The time period can be also scheduled as a special sub-frame or a block of symbol or symbols. The UE 602 may also perform the probing on UW on the UE waveform without CP or GP. For multiple-receive-beam UE the time period can overlap with data transmission, e.g. data and DMRS symbols.

The receive beamforming probing may include a complete receive beam sweeping, a pre-defined group of receive beams, e.g. adjacent receive beams (GOB) or +/− x degree (Continuous BF) and/or a cycling through previously used best receive beams. The UE 602 may measure the detected energy for each adjusted receive beam and find the best receive beam according to pre-defined criteria.

The probing period may be short in order to reduce the measurement overhead. The analogue measurement may not require reference signal transmission for certain waveform and may require short probing time. The UE 602 may update the active beam process with receive beam selection as result of the probing.

The UE 602 may also adjust receive beams associated with active beam processes based on the result of UE 602 rotation detection and receive beamforming measurement. The UE 602 may autonomously track the receive beam tracking with continuous analogue beamforming capability. The UE 602 may perform receive beamforming adjustment during a predefined time period similarly as receive beam probing configuration. The UE 602 may determine the adjustment based on measured rotation vectors, detected active beam pair energy variation (the wide band AGC value), received channel SINR using the active beam pair, channel quality measured in the receive beamforming measurement, etc. The UE 602 may apply the updated receive beam to continue the active data reception without knowledge of TRP. The UE 602 may update the active beam process due to receive beam adjustment and maintain a mapping of beam pair between one or multiple receive beams and one transmit beam.

UE May Determine "Best Beam" Based on Measuring Energy Over a Set of Resources Using a Set of Candidate Beams In some embodiments, the set of resources may be a specific time period or sequence of symbols within a downlink data transmission for the UE 602. The presence of the set of resources may be indicated in downlink control information applicable to the transmission, or configured by higher layers. In some solutions, the information mapped onto the set of resources may be encoded and/or modulated using parameters that are different from those of the remaining resources of the transmission to increase the probability of successful decoding even if a sub-optimal beam is used. The applicable parameters (e.g. code rate, modulation, or modulation and coding scheme index) may be indicated by downlink control information or configured by higher layers, or may be implicitly determined from the parameters used in the remaining resources, such as a pre-determined or pre-configured offset to the MCS index applied for the remainder of the transmission.

Network Architecture

Figure 7A:
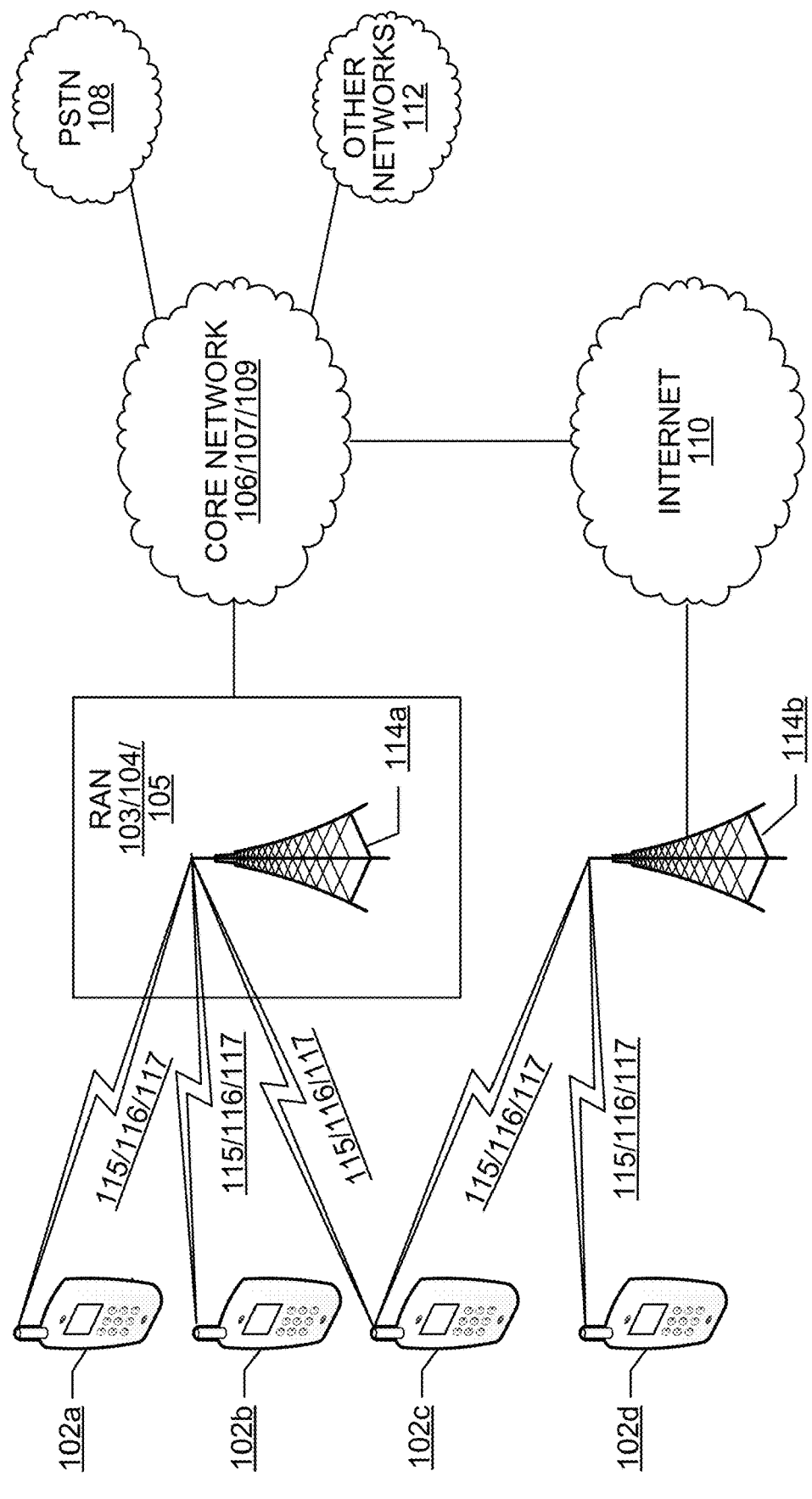
FIG. 7A depicts an example communications system in which one or more disclosed embodiments may be implemented.

The systems and methods relating multicast group formation may be used with the wireless communication systems described with respect to FIGS. 7A-7F. As an initial matter, these wireless systems will be described. FIG. 7A is a diagram of an example communications system 700 in which one or more disclosed embodiments may be implemented. The communications system 700 may be a multiple access system that provides content, such as voice, data, video, messaging, broadcast, and the like, to multiple wireless users. The communications system 700 may enable multiple wireless users to access such content through the sharing of system resources, including wireless bandwidth.

As shown in FIG. 7A, the communications system 700 may include WTRUs 102a, 102b, 102c, and/or 102d (which generally or collectively may be referred to as WTRU 102), a RAN 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 700 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors. For example, the cell associated with the base station 114a may be divided into three sectors. Thus, in one embodiment, the base station 114a may include three transceivers (one for each sector of the cell). In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, and the like). The air interface 115/116/117 may be established using any suitable radio access technology (RAT).

More specifically, as noted above, the communications system 700 may be a multiple access system and may employ one or more channel-access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 7A may be a wireless router, Home Node B, Home eNode B, or access point, as examples, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, and the like) to establish a picocell or femtocell. As shown in FIG. 7A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. As examples, the core network 106/107/109 may provide call control, billing services, mobile location-based services, pre-paid calling, Internet connectivity, video distribution, and the like, and/or perform high-level security functions, such as user authentication. Although not shown in FIG. 7A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and IP in the TCP/IP Internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 700 may include multi-mode capabilities, i.e., the WTRUs 102a, 102b, 102c, 102d may include multiple transceivers for communicating with different wireless networks over different wireless links. For example, the WTRU 102c shown in FIG. 7A may be configured to communicate with the base station 114a, which may employ a cellular-based radio technology, and with the base station 114b, which may employ an IEEE 802 radio technology.

Figure 7B:
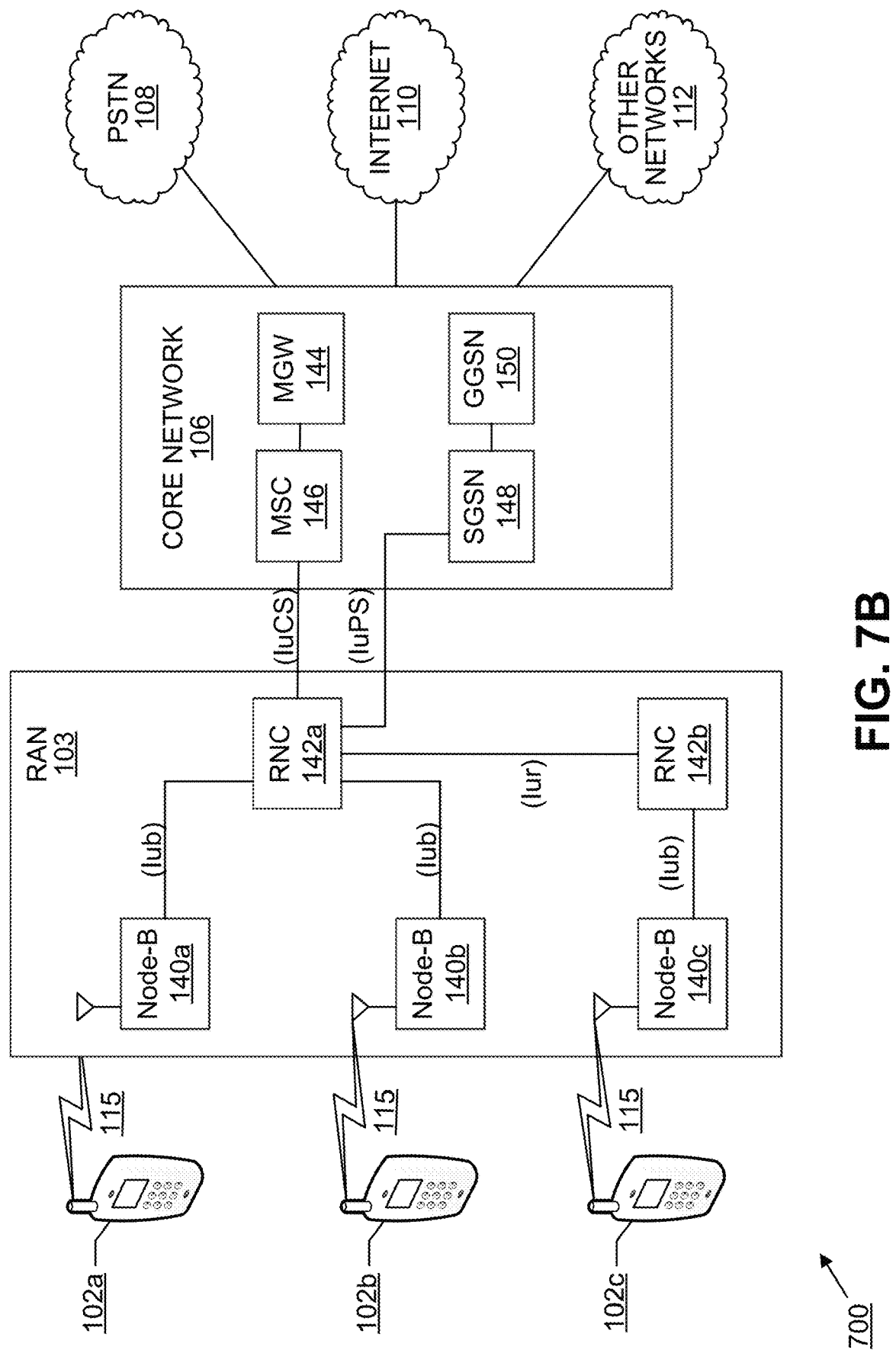
FIG. 7B depicts an example radio access network (RAN) and an example core network that may be used within the communications system of FIG. 7A.

FIG. 7B is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 7B, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 7B, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer-loop power control, load control, admission control, packet scheduling, handover control, macrodiversity, security functions, data encryption, and the like.

The core network 106 shown in FIG. 7B may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional landline communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106 may also be connected to the networks 112, which may include other wired and/or wireless networks that are owned and/or operated by other service providers.

Figure 7C:
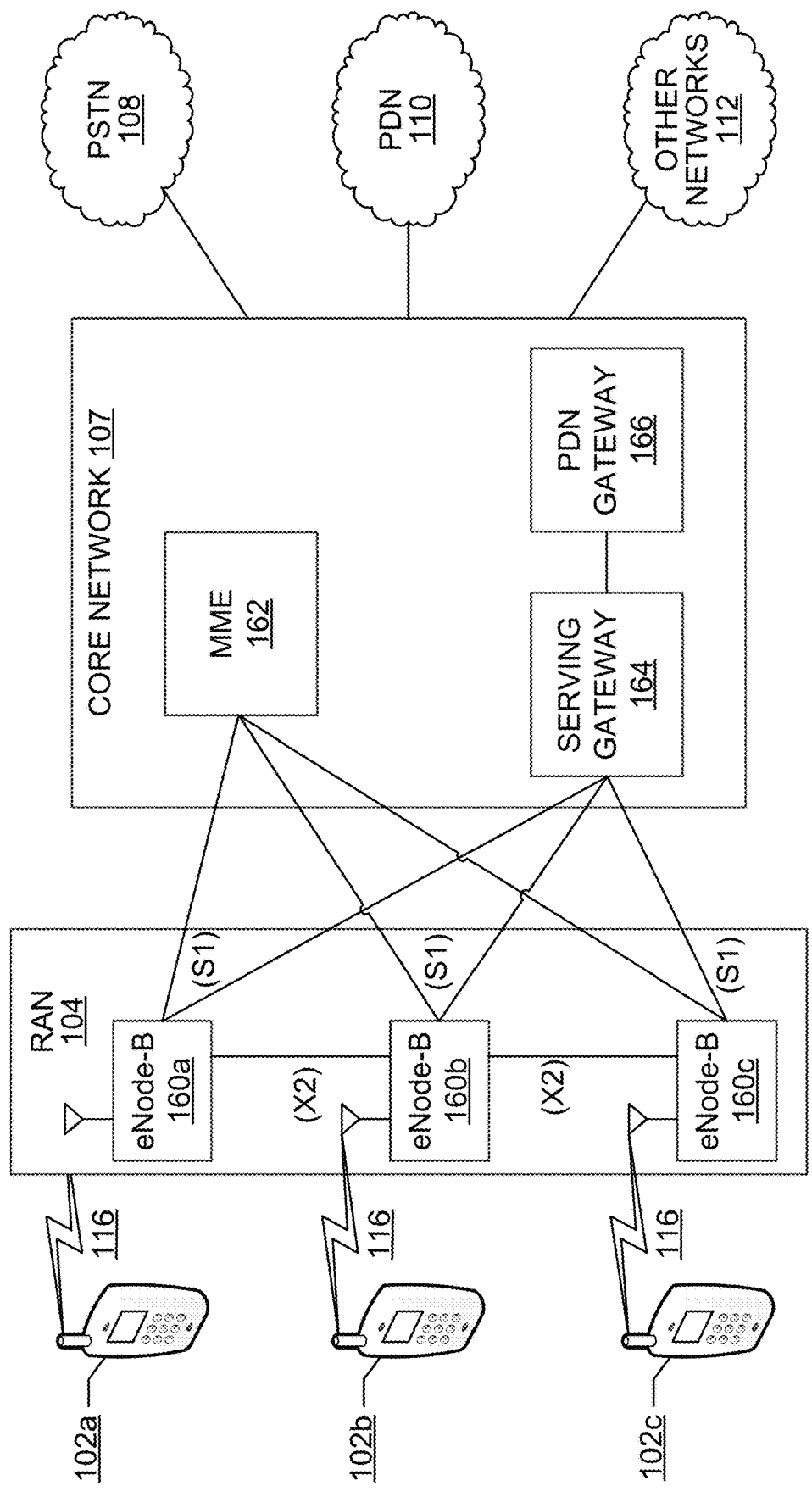
FIG. 7C depicts a second example RAN and a second example core network that may be used within the communications system of FIG. 7A.

FIG. 7C is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and receive wireless signals from, the WTRU 102a.

Each of the eNode Bs 160a, 160b, 160c may be associated with a particular cell (not shown) and may be configured to handle radio-resource-management decisions, handover decisions, scheduling of users in the uplink and/or downlink, and the like. As shown in FIG. 7C, the eNode Bs 160a, 160b, 160c may communicate with one another over an X2 interface.

The core network 107 shown in FIG. 7C may include a mobility management entity (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional landline communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired and/or wireless networks that are owned and/or operated by other service providers.

Figure 7D:
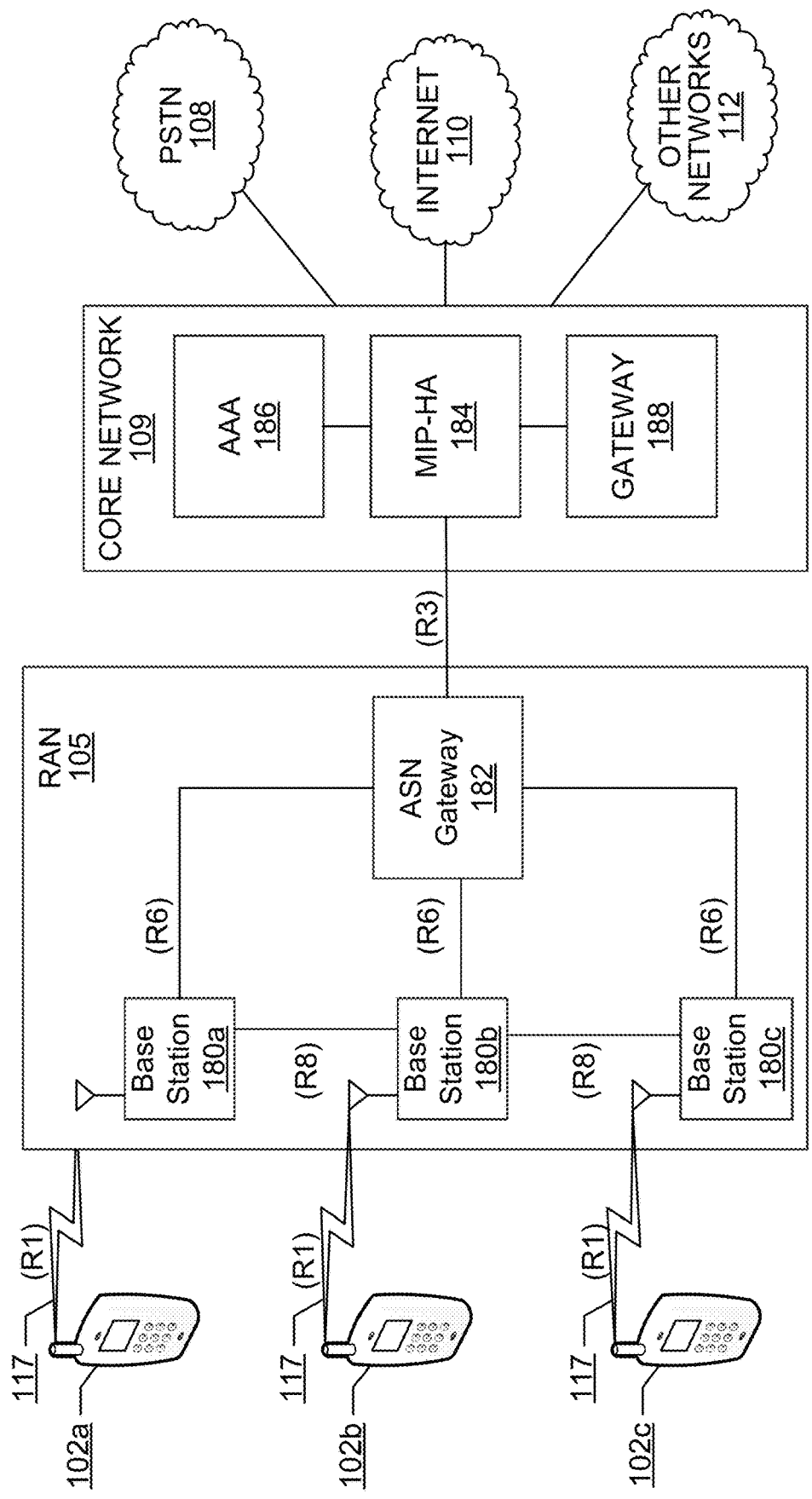
FIG. 7D depicts a third example RAN and a third example core network that may be used within the communications system of FIG. 7A.

FIG. 7D is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 7D, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility-management functions, such as handoff triggering, tunnel establishment, radio-resource management, traffic classification, quality-of-service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point (not shown), which may be used for authentication, authorization, IP-host-configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 7D, the RAN 105 may be connected to the core network 109. The communication link between the RAN 105 and the core network 109 may defined as an R3 reference point that includes protocols for facilitating data transfer and mobility-management capabilities, as examples. The core network 109 may include a mobile-IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA 184 may be responsible for IP-address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired and/or wireless networks that are owned and/or operated by other service providers.

Although not shown in FIG. 7D, it will be appreciated that the RAN 105 may be connected to other ASNs and the core network 109 may be connected to other core networks. The communication link between the RAN 105 the other ASNs may be defined as an R4 reference point (not shown), which may include protocols for coordinating the mobility of the WTRUs 102a, 102b, 102c between the RAN 105 and the other ASNs. The communication link between the core network 109 and the other core networks may be defined as an R5 reference point (not shown), which may include protocols for facilitating interworking between home core networks and visited core networks.

Figure 7E:
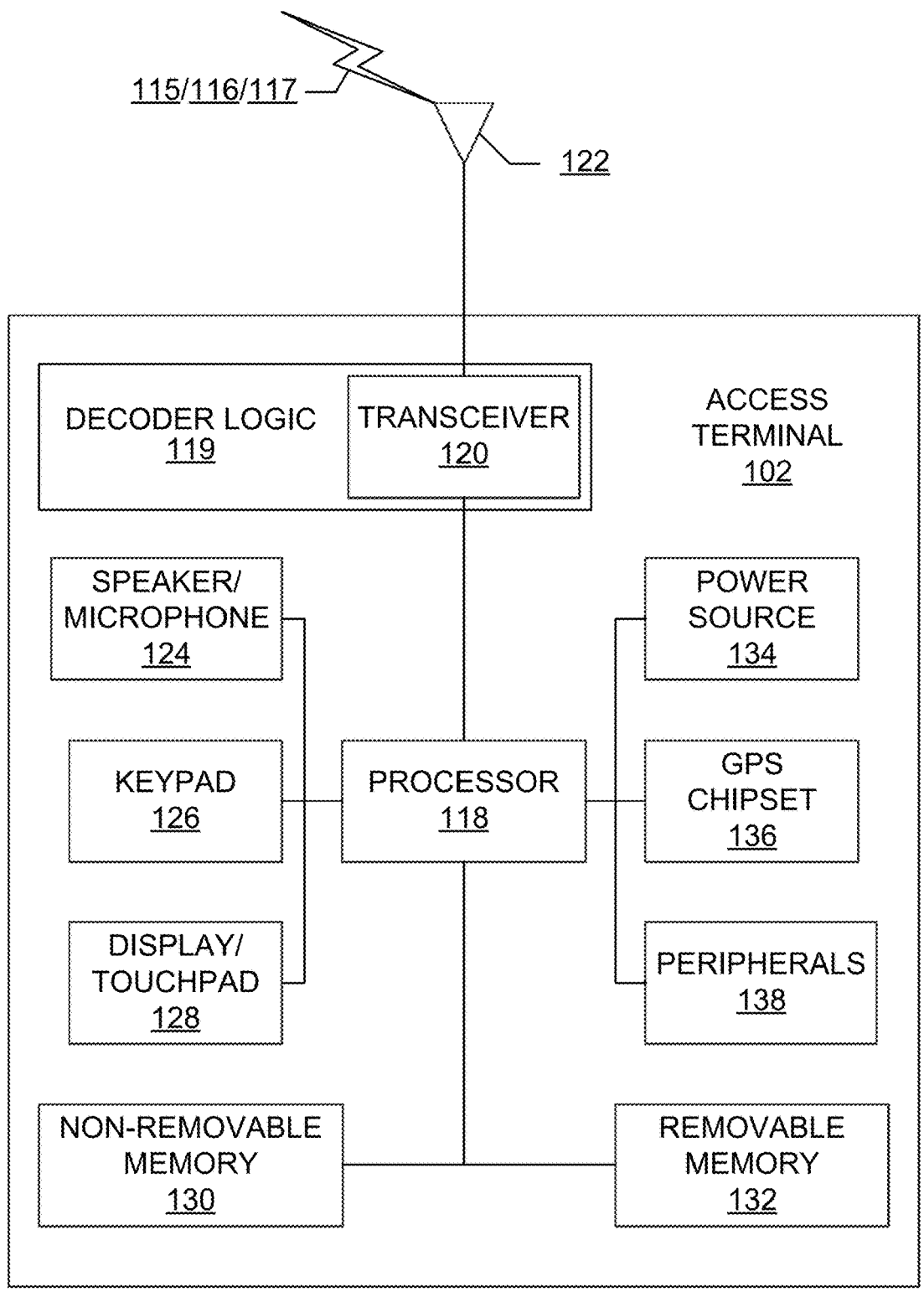
FIG. 7E depicts an example wireless transmit/receive unit (WTRU) that may be used within the communications system of FIG. 7A.

FIG. 7E is a system diagram of an example WTRU 102. As shown in FIG. 7E, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. The transceiver 120 may be implemented as a component of decoder logic 119. For example, the transceiver 120 and decoder logic 119 may be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 7E and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 7E depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 7E as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth© module, a frequency modulated (FM) radio unit, a digital music player, a media player, a video game player module, an Internet browser, and the like.

Figure 7F:
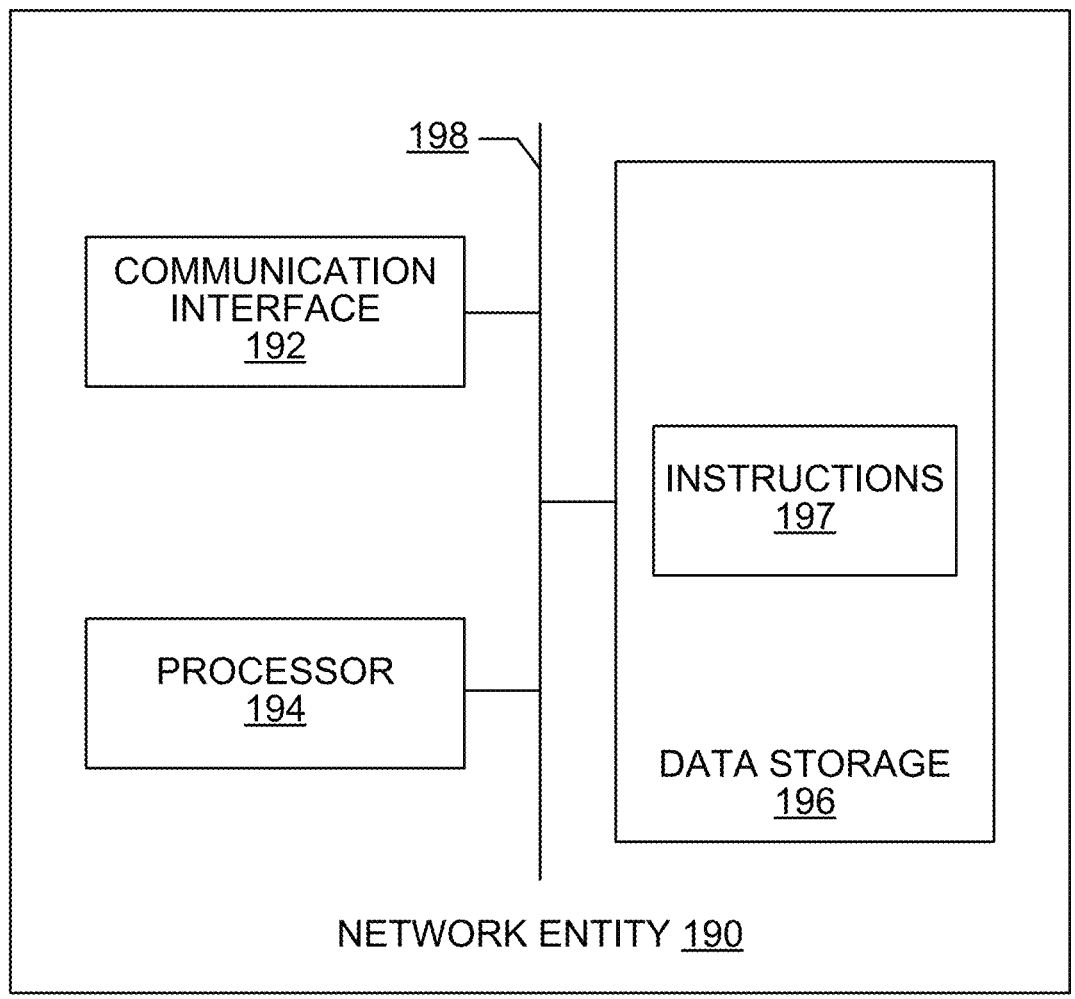
FIG. 7F depicts an exemplary network entity that may be used within the communication system of FIG. 7A.

FIG. 7F depicts an example network entity 190 that may be used within the communication system 700 of FIG. 7A. As depicted in FIG. 7F, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi-Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 7F, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 7F. In some embodiments, one or more of such functions are carried out by a set of multiple network entities in combination, where each network entity has a structure similar to that of network entity 190 of FIG. 7F. In various different embodiments, network entity 190 is—or at least includes—one or more of (one or more entities in) RAN 103, (one or more entities in) RAN 104, (one or more entities in) RAN 105, (one or more entities in) core network 106, (one or more entities in) core network 107, (one or more entities in) core network 109, base station 114a, base station 114b, Node-B 140a, Node-B 140b, Node-B 140c, RNC 142a, RNC 142b, MGW 144, MSC 146, SGSN 148, GGSN 150, eNode B 160a, eNode B 160b, eNode B 160c, MME 162, serving gateway 164, PDN gateway 166, base station 180a, base station 180b, base station 180c, ASN gateway 182, MIP-HA 184, AAA 186, and gateway 188. And certainly other network entities and/or combinations of network entities could be used in various embodiments for carrying out the network-entity functions described herein, as the foregoing list is provided by way of example and not by way of limitation.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Abbreviations Used

Δf Sub-carrier spacing
5gFlex 5G Flexible Radio Access Technology
5gNB 5GFlex NodeB
ACK Acknowledgement
BB Baseband
BLER Block Error Rate
BTI Basic TI (in integer multiple of one or more symbol duration)
CB Contention-Based (e.g. access, channel, resource)
CoMP Coordinated Multi-Point transmission/reception
CP Cyclic Prefix
CP-OFDM Conventional OFDM (relying on cyclic prefix)
CQI Channel Quality Indicator
CSI Channel State Information
CN Core Network (e.g. LTE packet core)
CRC Cyclic Redundancy Check
CSI Channel State Information
CSG Closed Subscriber Group
D2D Device to Device transmissions (e.g. LTE Sidelink)
DCI Downlink Control Information
DL Downlink
DM-RS Demodulation Reference Signal
DRB Data Radio Bearer
EIRP Equivalent Isotropically-Radiated Power
EPC Evolved Packet Core
FB Feed Back
FBMC Filtered Band Multi-Carrier
FBMC/OQAM A FBMC technique using Offset Quadrature Amplitude Modulation
FDD Frequency Division Duplexing
FDM Frequency Division Multiplexing
ICC Industrial Control and Communications
ICIC Inter-Cell Interference Cancellation
IP Internet Protocol
LAA License Assisted Access
LBT Listen-Before-Talk
LCH Logical Channel LCP Logical Channel Prioritization
LLC Low Latency Communications
LTE Long Term Evolution e.g. from 3GPP LTE R8 and up
MAC Medium Access Control
NACK Negative ACK
MBB Massive Broadband Communications
MC MultiCarrier
MCS Modulation and Coding Scheme
MIMO Multiple Input Multiple Output
MTC Machine-Type Communications
NAS Non-Access Stratum
OFDM Orthogonal Frequency-Division Multiplexing
OOB Out-Of-Band (emissions)
$P_{cmax}$ Total available UE power in a given TI
PHY Physical Layer
PRACH Physical Random Access Channel
PDU Protocol Data Unit
PER Packet Error Rate
PLMN Public Land Mobile Network
PLR Packet Loss Rate
PSS Primary Synchronization Signal
QoS Quality of Service (from the physical layer perspective)
RAB Radio Access Bearer
RACH Random Access Channel (or procedure)
RF Radio Front end
RLF Radio Link Failure
RNTI Radio Network Identifier
RRC Radio Resource Control
RRM Radio Resource Management
RS Reference Signal
RTT Round-Trip Time
SCMA Single Carrier Multiple Access
SDU Service Data Unit
SL Sidelink
SOM Spectrum Operation Mode
SS Synchronization Signal
SSS Secondary Synchronization Signal
SRB Signaling Radio Bearer
SWG Switching Gap (in a self-contained subframe)
TB Transport Block
TDD Time-Division Duplexing
TDM Time-Division Multiplexing
TI Time Interval (in integer multiple of one or more BTI)
TTI Transmission Time Interval (in integer multiple of one or more TI)
TRP Transmission/Reception Point
TRX Transceiver
UE User Equipment
UFMC Universal Filtered Multi-Carrier
UF-OFDM Universal Filtered OFDM
UL Uplink
URC Ultra-Reliable Communications
URLLC Ultra-Reliable and Low Latency Communications
V2V Vehicle to vehicle communications
V2X Vehicular communications
WLAN Wireless Local Area Networks and related technologies (IEEE 802.xx domain)
ZC Zadoff-Chu sequence

The invention claimed is:

1. A method for use by a user equipment (UE) entity comprising a plurality of antenna elements, the method comprising:
receiving, by the UE entity, configuration information indicating a plurality of beam processes, at least one of the plurality of beam processes corresponding to a radiation pattern obtained using a corresponding set of pre-coding weights, wherein at least one of the plurality of beam processes has a respective beam process identifier, wherein at least one of the plurality of beam processes is associated with a quasi co-located downlink reference signal, and wherein at least one of the plurality of beam processes is provisioned with resources for the quasi co-located downlink reference signal, the provisioned resources including an indication of time and frequency resources;
receiving, by the UE entity, an indication of the respective beam process identifier in a Medium Access Control (MAC) control element;
selecting, by the UE entity, a beam process from among the plurality of configured beam processes based on the indication of the respective beam process identifier received in the MAC control element; and
receiving, by the UE entity, communications from a transmission-reception point (TRP) using the selected beam process.

2. The method of claim 1, wherein receiving communication from the TRP further includes using at least one parameter associated with the quasi co-located downlink reference signal corresponding to the selected beam process.

3. The method of claim 1, further comprising transmitting, by the UE entity, communications to the TRP, wherein the selected beam process comprises a corresponding transmission power level and a corresponding timing advance, and wherein communicating using the selected beam process comprises transmitting using the corresponding transmission power level and the corresponding timing advance.

4. The method of claim 1, wherein the selected beam process comprises a corresponding automatic gain controller setting, and wherein receiving using the selected beam process includes receiving using the corresponding automatic gain controller setting.

5. The method of claim 1, further comprising configuring an additional beam process in response to an indication received by the UE entity from the TRP.

6. The method of claim 1, further comprising reconfiguring at least a respective one of the plurality of beam processes in response to proximity of a corresponding beam to a human body.

7. The method of claim 1, further comprising configuring at least a respective one of the plurality of beam processes by selecting a corresponding beam for use with the respective beam process from among a plurality of available beams.

8. The method of claim 1, wherein a respective beam process of the plurality of beam processes is associated with a beam for reception, and wherein the beam for reception is determined by the UE entity by performing measurements on the quasi co-located downlink reference signal.

9. The method of claim 1, wherein receiving the communications from the TRP using the selected beam process includes receiving a downlink physical channel transmission.

10. A method for use by a user equipment (UE) entity comprising a plurality of antenna elements, the method comprising:
receiving, by the UE entity, configuration information indicating a plurality of beam processes, at least one of the plurality of beam processes corresponding to a radiation pattern obtained using a corresponding set of pre-coding weights, wherein at least one of the plurality of beam processes has a respective beam process identifier, wherein at least one of the plurality of beam processes is associated with a quasi co-located downlink reference signal, and wherein at least one of the plurality of beam processes is provisioned with resources for the quasi co-located downlink reference signal, the provisioned resources including an indication of time and frequency resources;

selecting, by the UE entity, a beam process from among the plurality of configured beam processes based on a beam process used for decoding a downlink control information from a downlink physical control channel transmission, the downlink control information indicating the downlink transmission; and receiving, by the UE entity, communications from a transmission-reception point (TRP) using the selected beam process.

11. The method of claim 10, wherein receiving communication from the TRP further includes using at least one parameter associated with the quasi co-located downlink reference signal corresponding to the selected beam process.

12. A user equipment (UE) entity comprising a plurality of antenna elements, a processor and a non-transitory computer-readable storage medium having stored instructions operative, when executed on the processor, to perform functions comprising:

receiving, by the UE entity, configuration information indicating a plurality of beam processes, at least one of the plurality of beam processes corresponding to a radiation pattern obtained using a corresponding set of pre-coding weights, wherein at least one of the plurality of beam processes has a respective beam process identifier, wherein at least one of the plurality of beam processes is associated with a quasi co-located downlink reference signal, and wherein at least one of the plurality of beam processes is provisioned with resources for the quasi co-located downlink reference signal, the provisioned resources including an indication of time and frequency resources;

receiving, by the UE entity, an indication of the respective beam process identifier in a Medium Access Control (MAC) control element;

selecting, by the UE entity, a beam process from among the plurality of configured beam processes based on the indication of the respective beam process identifier received in the MAC control element; and receiving, by the UE entity, communications from a transmission-reception point (TRP) using the selected beam process.

13. The UE entity of claim 12, wherein receiving communication from the TRP further includes using at least one parameter associated with the quasi co-located downlink reference signal corresponding to the selected beam process.

14. The UE entity of claim 12, wherein the functions further comprise transmitting, by the UE entity, communications to the TRP, wherein the selected beam process comprises a corresponding transmission power level and a corresponding timing advance, and wherein communicate using the selected beam process comprises transmit using the corresponding transmission power level and the corresponding timing advance.

15. The UE entity of claim 12, wherein the selected beam process comprises a corresponding automatic gain controller setting, and wherein receive using the selected beam process includes receive using the corresponding automatic gain controller setting.

16. The UE entity of claim 12, wherein the functions further comprise configuring an additional beam process in response to an indication received by the UE entity from the TRP.

17. The UE entity of claim 12, wherein the functions further comprise reconfiguring at least a respective one of the plurality of beam processes in response to proximity of a corresponding beam to a human body.

18. The UE entity of claim 12, wherein the functions further comprise configuring at least a respective one of the plurality of beam processes by selecting a corresponding beam for use with the respective beam process from among a plurality of available beams.

19. A user equipment (UE) entity comprising a plurality of antenna elements, a processor and a non-transitory computer-readable storage medium storing instructions operative, when executed on the processor, to perform functions comprising:

receiving, by the UE entity, configuration information indicating a plurality of beam processes, at least one of the plurality of beam processes corresponding to a radiation pattern obtained using a corresponding set of pre-coding weights, wherein at least one of the plurality of beam processes has a respective beam process identifier, wherein at least one of the plurality of beam processes is associated with a quasi co-located downlink reference signal, and wherein at least one of the plurality of beam processes is provisioned with resources for the quasi co-located downlink reference signal, the provisioned resources including an indication of time and frequency resources;

selecting, by the UE entity, a beam process from among the plurality of configured beam processes based on a beam process used for decoding a downlink control information from a downlink physical control channel transmission, the downlink control information indicating the downlink transmission; and receiving, by the UE entity, communications from a transmission-reception point (TRP) using the selected beam process.

20. The UE entity of claim 19, wherein receiving communication from the TRP further includes using at least one parameter associated with the quasi co-located downlink reference signal corresponding to the selected beam process.

* * * * *